US011705987B2

(12) United States Patent
Chan et al.

(10) Patent No.: US 11,705,987 B2
(45) Date of Patent: Jul. 18, 2023

(54) APPARATUS AND METHOD FOR HANDLING AN INCOMING COMMUNICATION DATA FRAME

(71) Applicant: Infineon Technologies AG, Neubiberg (DE)

(72) Inventors: Wai Keung Frankie Chan, Singapore (SG); Klaus Scheibert, Grasbrunn (DE); Harald Zweck, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/333,365

(22) Filed: May 28, 2021

(65) Prior Publication Data

US 2021/0376954 A1 Dec. 2, 2021

(30) Foreign Application Priority Data

May 29, 2020 (DE) .......................... 102020114547.0

(51) Int. Cl.
*H04L 1/20* (2006.01)
*H04L 1/00* (2006.01)

(52) U.S. Cl.
CPC .......... *H04L 1/0045* (2013.01); *H04L 1/0061* (2013.01); *H04L 1/201* (2013.01)

(58) Field of Classification Search
CPC ..... H04L 1/0045; H04L 1/0061; H04L 1/201; H04L 69/22; H04L 63/02; H04L 12/4641

(Continued)

(56) References Cited

U.S. PATENT DOCUMENTS 6,859,456 B1 * 2/2005 Hetherington ........ H04L 1/1841
370/332
7,334,176 B2 * 2/2008 Schroder ............... G10L 19/167
714/775

(Continued)

FOREIGN PATENT DOCUMENTS

WO 2011/006117 A2 1/2011

OTHER PUBLICATIONS

German Patent Office, Office Action issued for DE 102020114547.0, 7 pgs., dated Nov. 23, 2020.

*Primary Examiner* — Albert Decady
*Assistant Examiner* — Enam Ahmed
(74) *Attorney, Agent, or Firm* — Banner & Witcoff Ltd.

(57) ABSTRACT

An apparatus for handling an incoming communication data frame containing a plurality of bits is provided. The apparatus may include a plurality of data matchers, each data matcher configured to compare a subset of the plurality of bits of the communication data frame with a predetermined data pattern of a plurality of data patterns and to provide a data matcher output to indicate the result of the data matcher comparison, a plurality of selectors, each selector configured to compare a subset of the data matcher outputs of the plurality of data matchers with a predetermined selection pattern of a plurality of selection patterns and to provide a selector output to indicate the result of the selector comparison, and a frame filter configured to transfer the incoming frame to application logic only if the selector outputs of the plurality of selectors match a predetermined filter pattern, and to also transfer the selector outputs of the plurality of selectors to the application logic.

24 Claims, 15 Drawing Sheets

(58) Field of Classification Search
USPC .......................................................... 714/776
See application file for complete search history.

(56) References Cited

U.S. PATENT DOCUMENTS

| | | | | |
|---|---|---|---|---|
| 8,370,724 | B2* | 2/2013 | Chiba | .................... G10L 19/005 |
| | | | | 714/776 |
| 8,413,012 | B2* | 4/2013 | Limberg | ................. H04L 1/005 |
| | | | | 714/776 |
| 10,594,423 | B1* | 3/2020 | Anand | ..................... H04L 69/22 |
| 2002/0176413 | A1* | 11/2002 | McGinn | .................. H04L 69/12 |
| | | | | 370/506 |
| 2005/0044471 | A1* | 2/2005 | Chia | ................... H04L 47/2416 |
| | | | | 714/776 |
| 2006/0274768 | A1* | 12/2006 | Suzuki | ................... H04L 43/00 |
| | | | | 370/398 |
| 2009/0254793 | A1* | 10/2009 | Takahashi | ............. H04L 1/0047 |
| | | | | 714/776 |
| 2011/0066924 | A1* | 3/2011 | Dorso | ................... G06F 11/202 |
| | | | | 709/204 |
| 2011/0191656 | A1* | 8/2011 | Bliss | ..................... H04L 1/0045 |
| | | | | 714/776 |
| 2014/0108892 | A1* | 4/2014 | Eliaz | ................. H04L 25/03885 |
| | | | | 714/776 |

* cited by examiner

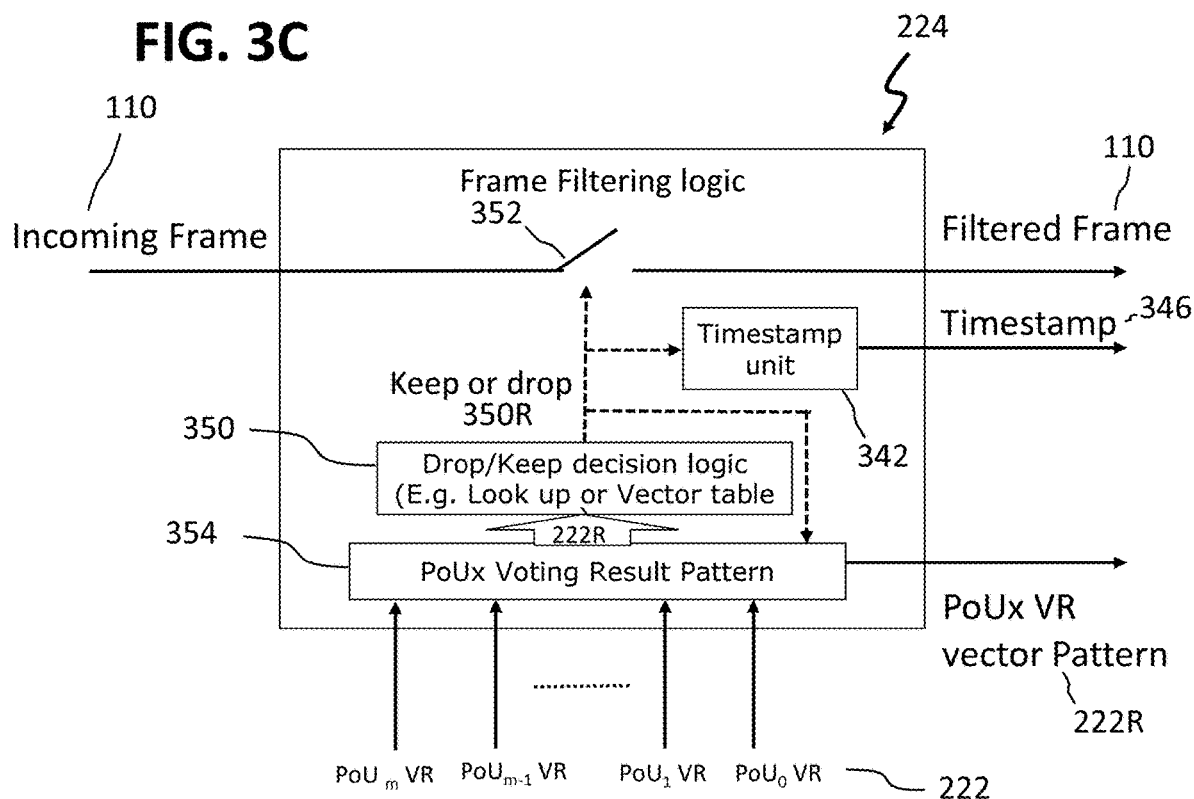

US 11,705,987 B2

APPARATUS AND METHOD FOR HANDLING AN INCOMING COMMUNICATION DATA FRAME

TECHNICAL FIELD

Various embodiments relate generally to an apparatus and to a method for handling an incoming communication data frame.

BACKGROUND

Pattern detection in data frames may be important in a context of communication, in particular with respect to data frames entering a data processing system. The pattern detection may for example be used in a firewall, for intrusion detection, filtering, and data flow control.

Devices and processes for distinguishing wanted/expected incoming communication data frames from unwanted/unexpected incoming communication data frames available in the prior art may have limited success. For example, they may let unwanted data frames pass, and may refuse wanted data frames.

SUMMARY

An apparatus for handling an incoming communication data frame containing a plurality of bits is provided. The apparatus may include a plurality of data matchers, each data matcher configured to compare a subset of the plurality of bits of the data frame with a predetermined data pattern of a plurality of data patterns and to provide an output to indicate the result of said comparison, a plurality of selectors, each selector configured to compare a subset of the outputs of the plurality of data matchers with a predetermined selection pattern of a plurality of selection patterns and to provide an output to indicate the result of said comparison, and a frame filter configured to transfer the incoming frame to an application logic block only if the outputs of the plurality of selectors match a predetermined filter pattern, and to also transfer the outputs of the plurality of selectors to the application logic.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

each of FIG. 1A

FIG. 3C shows a schematic illustration of a frame filter of an apparatus for handling an incoming communication data frame in accordance with various embodiments;

FIG. 3D shows a table illustrating an exemplary frame filter process of the frame filter of FIG. 3C;

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various aspects of the disclosure are provided for devices, and various aspects of the disclosure are provided for methods. It will be understood that basic properties of the devices also hold for the methods and vice versa. Therefore, for sake of brevity, duplicate description of such properties may have been omitted.

Some of the elements described herein may include or consist of a plurality of similar or identical elements that may be referred to as a group of elements with a generic reference number. For addressing individual elements of the group, they may be distinguished from each other by, e.g., appended numbers. To avoid crowding, some of the reference numbers may have been omitted in the figures.

Figure 1A:
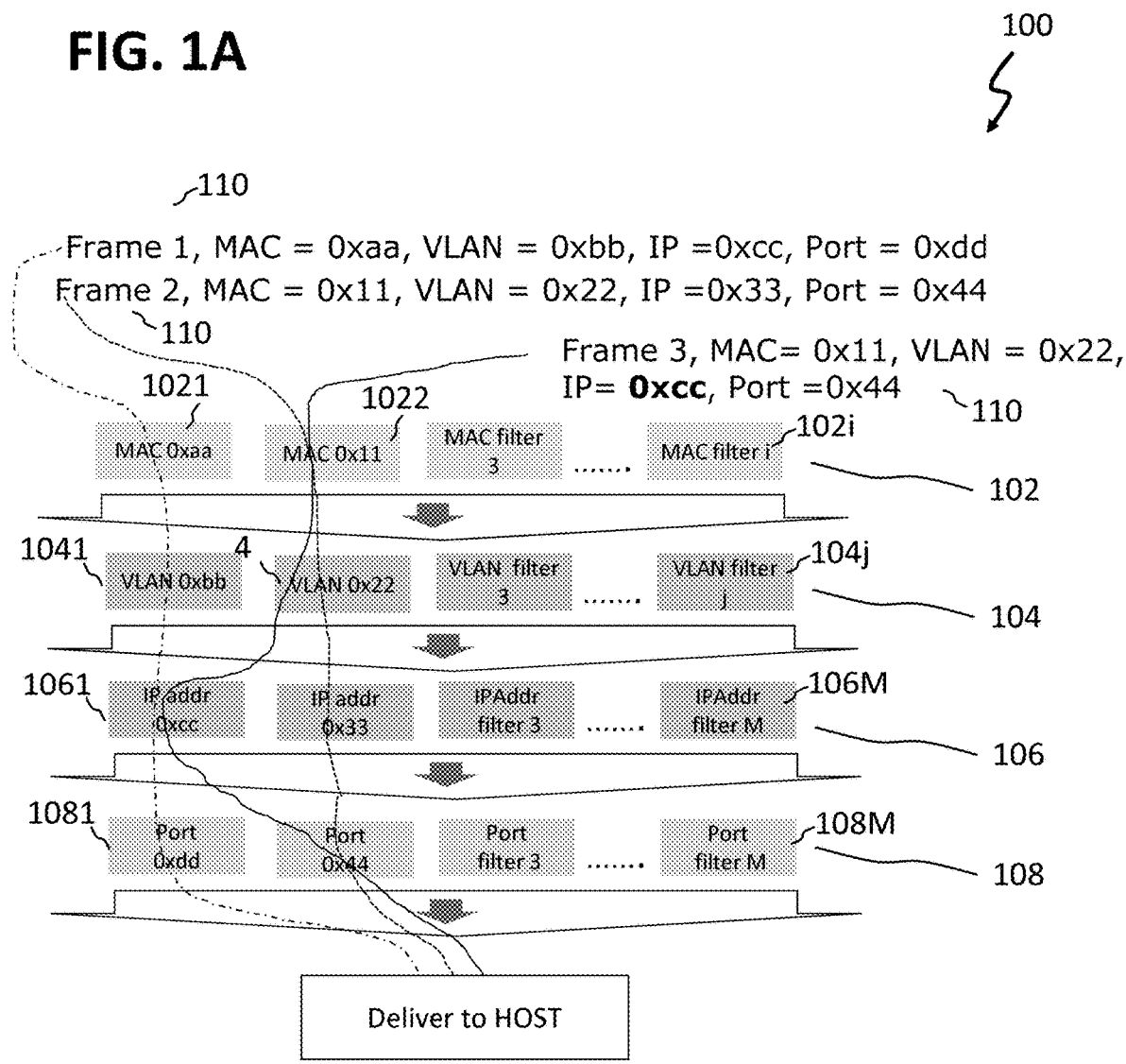
FIG. 1B shows a schematic illustration of an apparatus for handling an incoming communication data frame according to prior art.
Figure 1B:
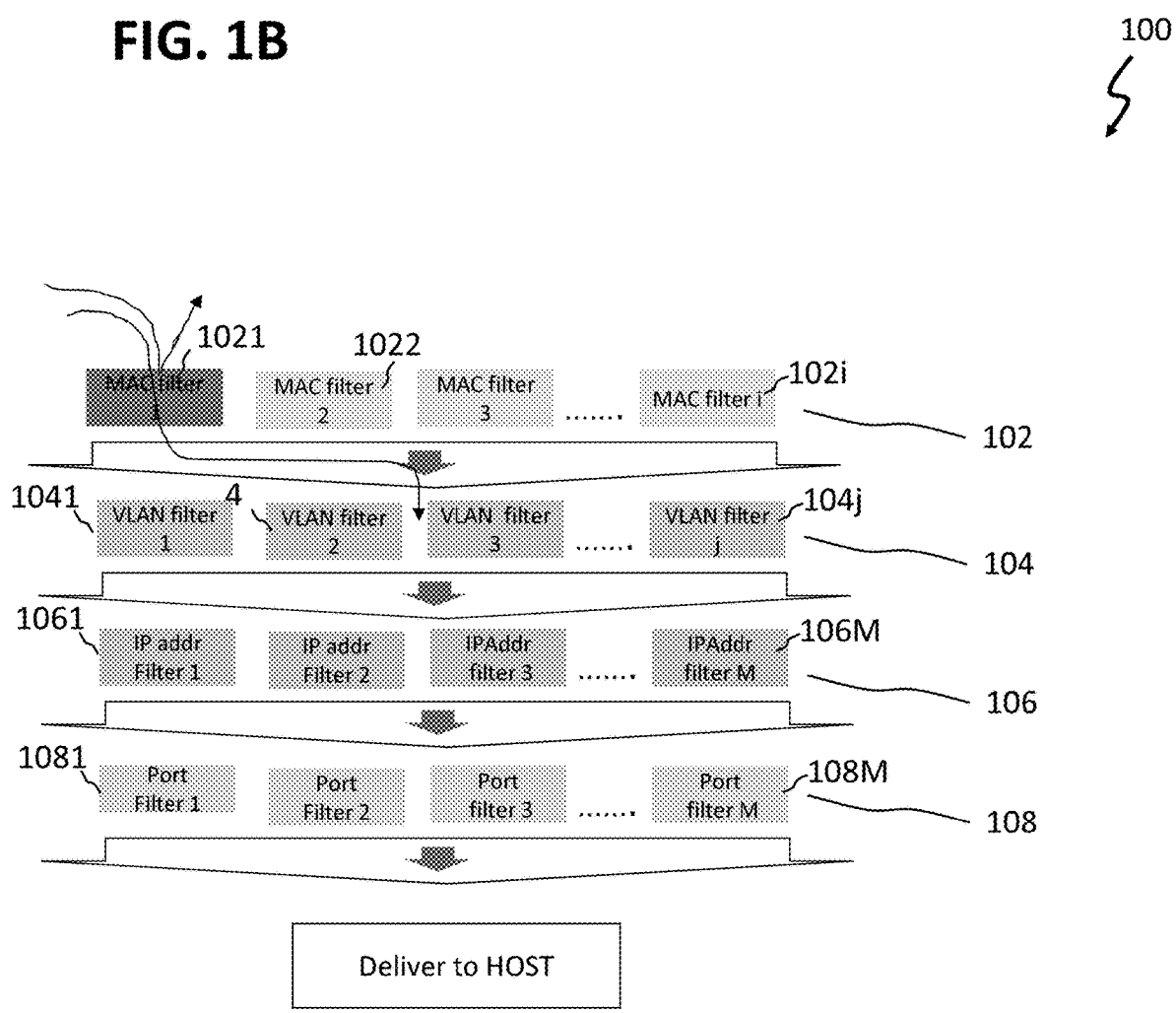

Each of FIG. 1A and FIG. 1B shows a schematic illustration of an apparatus 100 for handling an incoming communication data frame 110 (also referred to as data frame or frame) according to prior art.

The apparatus 100 may include a plurality of filters 102, 104, 106, 108, each of which may include a plurality of filter elements 1021, . . . , 102i, 1041, . . . , 104j, etc.

Each of the filter elements 1021, 1022, . . . , 1041, . . . 104j, etc. may be configured to either accept or reject an incoming communication data frame 110 based on an analysis of a portion of the data frame 110.

This kind of multi-layer filtering may for example need to process unexpected frames 110 that may be triggered by system failures, and/or unintended frames 110 as e.g. triggered by attacks, and may be expected to reject such frames 110.

As illustrated in FIG. 1A, for each of the filters 102, 104, 106, 108, a filtering result may be independent of the other filters 102, 104, 106, 108. This may lead to a situation as illustrated in FIG. 1A, in which two data frames 110 indicated as frame 1 and frame 2, which are meant to be approved by the apparatus 100, indeed pass all the filters 102, 104, 106, 108, but also a third data frame 110, indicated as frame 3, which combines data frame portions of frame 1 and frame 2, passes all the filters 102, 104, 106, 108, even though it is meant to be rejected by the apparatus 100.

The data frame 110 may for example be an Ethernet frame in accordance with a respective standard (e.g., IEEE 802.3) and may include payload data of a plurality of communication protocol layers.

Each of the plurality of filters 102, 104, 106, 108 may provide a plurality of filter elements 1021, ..., 102$i$, 1041, ..., 104$j$, etc. for one of the communication protocol layers. For example, the filter 102 may provide filter elements 1021, 1022, ..., 102$i$ for MAC addresses to be approved, the filter 104 may provide filter elements 1041, 1042, ..., 104$i$ for VLAN tags to be approved, etc.

Depending on which of the filters 102, 104, 106, 108 are provided, the exemplary Ethernet frames 110 may be filtered and processed based on the MAC address filter 102 only, or on the MAC address and the VLAN tag, or for example on the MAC address, VLAN tag, IP address and Port number, and/or on specific, proprietary frame elements, etc.

For each of the communication protocol layers, the apparatus 100 may be configured to check if the data frame 110 passes one of the filter elements (e.g. 1021, 1022, ..., 102$i$) of the corresponding filter (e.g. 102), and to hand over a passed data frame 110 to a check with respect to a subsequent filter (e.g. 104).

Thus, as shown in FIG. 1A, the apparatus 100 with the multi-layer filtering provided by independent filters 102, 104, 106, 108 for the different layers may not be able to provide a unique path filtering, in other words unable to provide unambiguous results. If it is to be made sure that the unintended frame 3 is dropped, an additional effort needs to be made.

Moreover, as shown in FIG. 1B, a failed filter element 1021 may pass all incoming frames 110, even those that should be rejected, or the failed filter element 1021 may reject all incoming frames 110, even those that should be allowed to pass.

Thus, the apparatus 100 with this kind of multi-layer filtering may not be able to provide availability and reliability, for example of applications that need to be provided with expected incoming data frames 110 while being protected from defective and/or dangerous data frames 110.

In various embodiments, an apparatus and a method are provided that unambiguously recognize/identify/process incoming communication data frames.

The apparatus may be based on hardware enabled agents. Thereby, an overwhelming of limited resources of a host processor may be avoided.

This apparatus, which may be considered to form a pattern detection engine, may be configurable, in other words may work flexibly. Furthermore, the apparatus may lead to a safe, deterministic and unambiguous filtering result. These may for example be required in cars used for autonomous driving, for example in their intrusion detection and prevention systems (IDPS).

Figure 2:
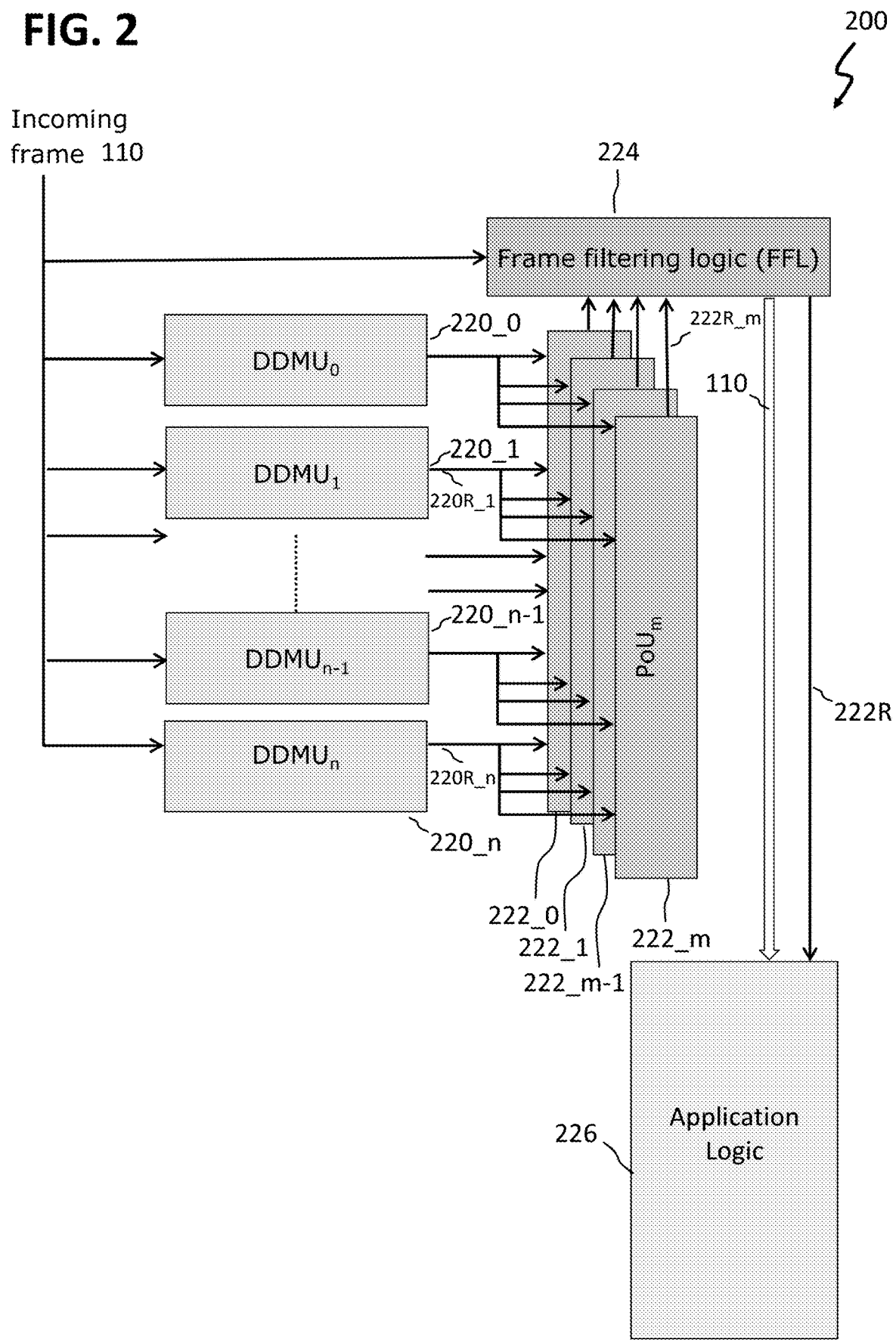
FIG. 2 shows a schematic illustration of an apparatus for handling an incoming communication data frame in accordance with various embodiments.

FIG. 2 shows a schematic illustration of an apparatus 200 for handling an incoming communication data frame 110 in accordance with various embodiments.

The communication data frame 110 may contain a plurality of bits. Each data frame 110 may for example include payload data of a plurality of communication protocol layers. The data frame 110 may for example be similar or identical to the data frame 110 described in context with FIG. 1A and FIG. 1B. The data frame 110 may for example be an Ethernet frame.

The apparatus 200 may include a plurality of data matchers 220. The individual data matchers have reference numbers 220_0, ..., 220_1, ..., 220_$n$, for n greater or equal to 1. Each of the data matchers 220_1, ..., 220_$n$ may be configured to compare a subset of the plurality of bits of the data frame 110 with a predetermined data pattern (which may be selected from a plurality of predetermined data patterns) and to provide an output 220R to indicate the result of said comparison. The individual results have reference numbers 220R_0, ..., 220R_1, ..., 220R_n. Details of the data matchers 220 will be explained below with reference to FIG. 3A and to the examples illustrated in FIGS. 4A and 4B.

The apparatus 200 may further include a plurality of selectors 222. The individual selectors have reference numbers 222_0, ..., 222_1, ..., 222_$m$, for m greater or equal to 1. The number of data matchers 220 may be different from or identical to the number of selectors 222. Each of the selectors 222 may be configured to compare a subset of the outputs 220R of the plurality of data matchers 220 with a predetermined selection pattern (which may be selected from a plurality of predetermined selection patterns) and to provide an output 222R to indicate the result of said comparison. The individual results have reference numbers 222R_0, ..., 222R_1, ..., 222R_m. Details of the selectors 222 will be explained below with reference to FIG. 3B and to the examples illustrated in FIG. 5A to 5C.

The apparatus 200 may further include a frame filter 224 configured to transfer the incoming frame 110 to an application logic block 226 only if the outputs 222R of the plurality of selectors 222 match a predetermined filter pattern, and to also transfer the outputs 222R of the plurality of selectors 222 to the application logic 226. Details of the frame filter 224 will be explained below with reference to FIG. 3C.

Figure 3A:
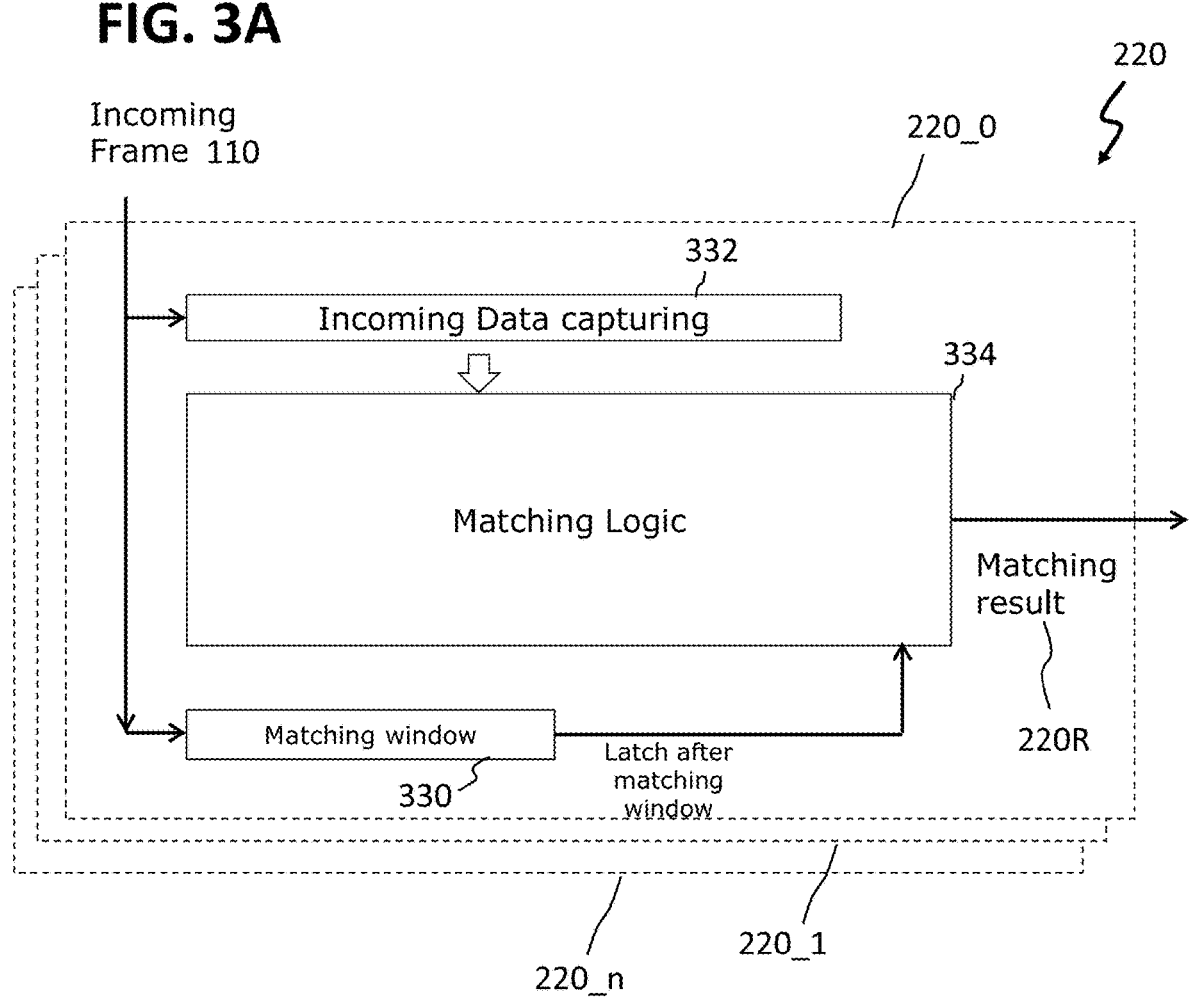
FIG. 3A shows a schematic illustration of a data matcher of an apparatus for handling an incoming communication data frame in accordance with various embodiments.
Figure 4A:
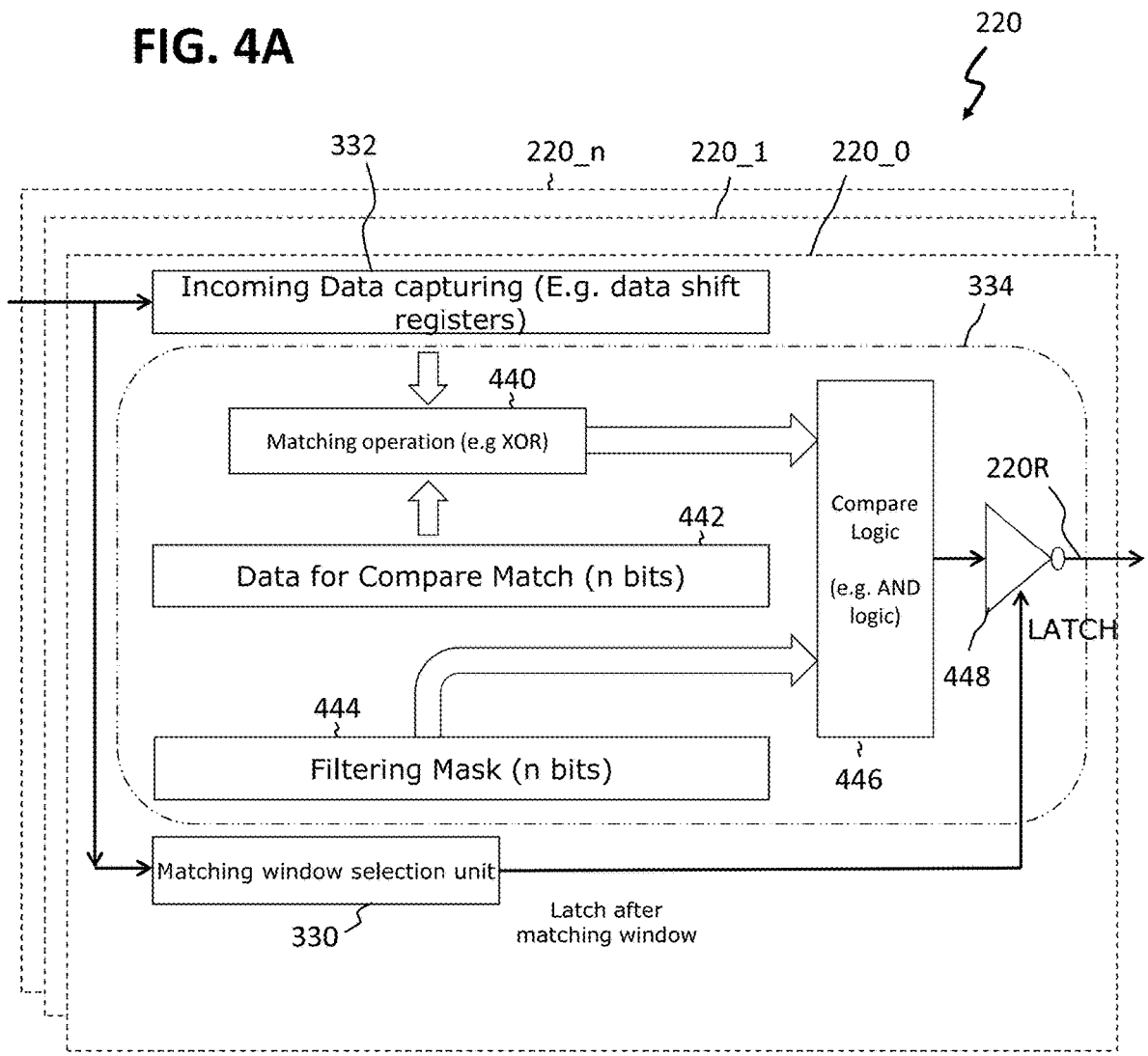
FIG. 4A shows a schematic illustration of a data matcher of an apparatus for handling an incoming communication data frame in accordance with various embodiments.
Figure 4B:
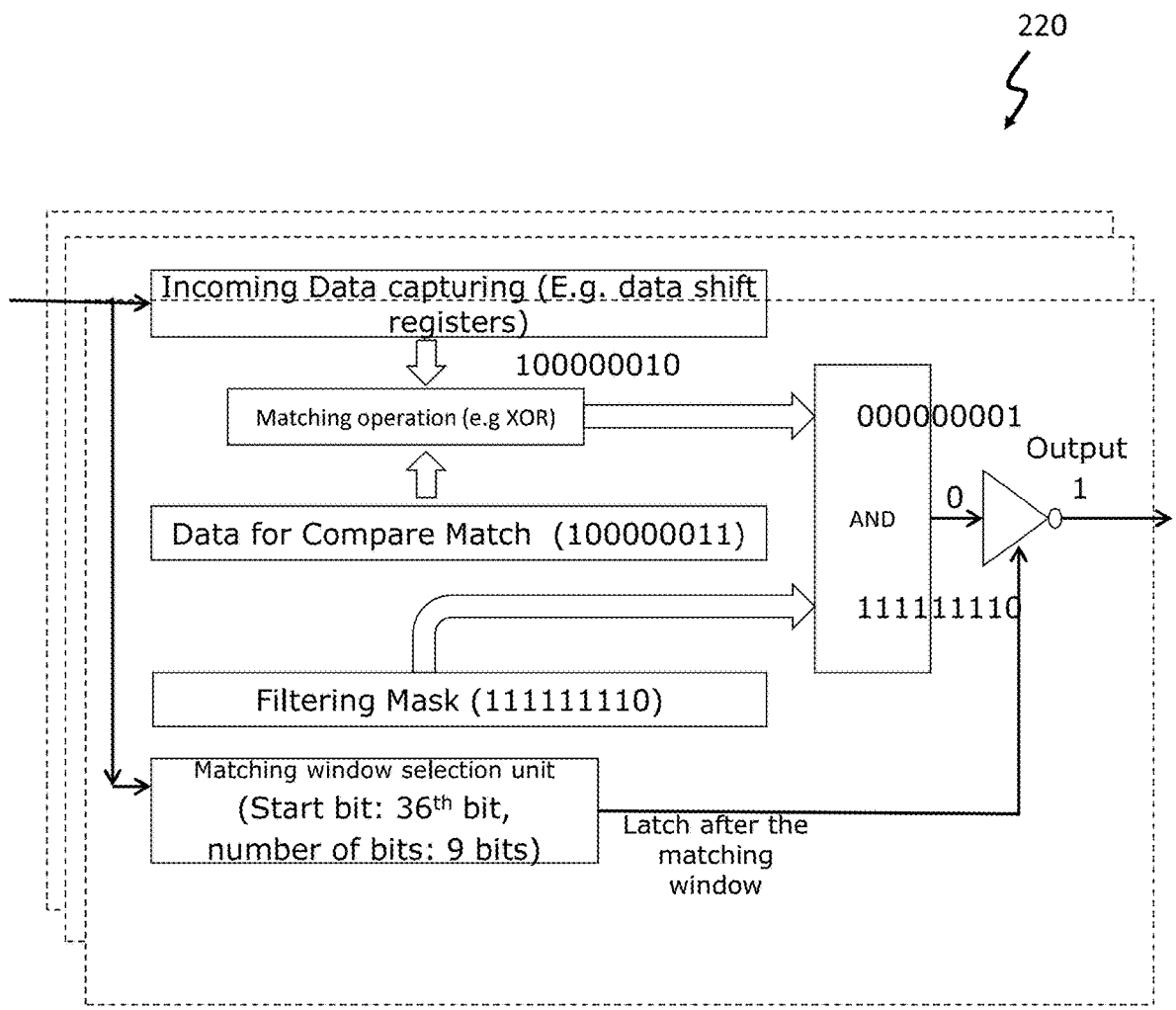
FIG. 4B illustrates for an exemplary embodiment how the data matcher of FIG. 4A works.

Each of FIG. 3A and FIG. 4A shows a schematic illustration of a data matcher 220_0 of an apparatus 200 for handling an incoming communication data frame 110 in accordance with various embodiments, and FIG. 4B illustrates for an exemplary embodiment how the data matcher 220_0 of FIG. 4A works. Further data matchers 220_1, ..., 220_$n$ are schematically indicated as being stacked behind the data matcher 220_0 to form together the plurality of data matchers 220.

The data matcher 220_0 may be a single data matcher 220, labelled in the figures also as DDMU (for "dynamic data matching unit"), that is configured to perform, in a dynamic and deterministic way, a detection/search/identification of a (sub-) data pattern.

In other words, a single data matcher 220_0 may be configured to detect a deterministic single pattern characteristic in a particular matching window of the plurality of bits of the communication data frame 110 that form a data pattern (DP). The matching window and pattern characteristic may be flexible.

The data pattern may include or consist of sets of sub data patterns, in other words of subsets of the plurality of bits of the data frame. Recognizing some of sub data patterns may make it possible to identify the complete data pattern. Thereby, an evaluation of the data frame 110 (in the sense of pass/fail) may be made possible. Therefore, the data matchers 220_1, ..., 220_$n$ may be grouped together to form the plurality of data matchers 220 to detect/search/identify the predetermined data pattern.

Each of the data matchers 220_1, ..., 220_$n$ may be configurable/programmable independently to detect/search/identify particular predetermined (sub) data patterns from the incoming frame 110. The predetermined data patterns may be selected from a plurality of predetermined data patterns.

In various embodiments, each of the data matchers 220_1, ..., 220_n may be configured to match a different subset of the plurality of bits of the data frame 110 to a different predetermined data pattern of the plurality of predetermined data patterns. In other words, the matching process may provide a diversity.

In an apparatus 200 in accordance with various embodiments and configured to provide diversity, a first data matcher 220_1 of the plurality of data matchers 220 may be configured to compare a first subset of the plurality of bits of the data frame 110 with a first predetermined data pattern of the plurality of data patterns and to provide a first output 220R_1 to indicate the result of said comparison, that a second data matcher 220_2 of the plurality of data matchers 220 may be configured to compare a second subset of the plurality of bits of the data frame 110 with a second predetermined data pattern of the plurality of data patterns and to provide a second output 220R_2 to indicate the result of said comparison, that the first subset of the plurality of bits of the data frame 110 originates from a different position in the data frame than the second subset of the plurality of bits of the data frame 110, and that the first predetermined data pattern is different from the second predetermined data pattern.

In various embodiments, the first subset of the plurality of bits may originate from a first layer of a plurality of communication protocol layers included in the data frame 110, and the second subset of the plurality of bits may originate from a second layer of the plurality of communication protocol layers.

In various embodiments, two or more of the data matchers 220_1, ..., 220_n may be configured to compare the same subset of the plurality of bits of the data frame 110 to the same predetermined data pattern. In other words, two or more redundant data matchers 220_1, ..., 220_n may be provided, for example for identifying defective data matchers 220, and/or for limiting their harmful effect. Examples of such a configuration are described in context with FIG. 6A to FIG. 6H.

In an apparatus 200 in accordance with various embodiments and configured to provide redundancy, a third data matcher 220_3 of the plurality of data matchers 220 may be configured to compare a third subset of the plurality of bits of the data frame 110 with a third predetermined data pattern of the plurality of data patterns and to provide a third output 220R_3 to indicate the result of said comparison, and that a fourth data matcher 220_4 of the plurality of data matchers 220 may be configured to compare the third subset of the plurality of bits of the data frame 110 with the third predetermined data pattern of the plurality of data patterns and to provide a fourth output 220R_4 to indicate the result of said comparison.

In various embodiments, each of the predetermined selection patterns and the predetermined filter pattern may be set in such a way that a final result provided by the frame filter indicates a match (and transfers the data frame 110 to the application logic 226) only if the third output matches the fourth output, because discrepant results for redundant checks would be indicative of a filter failure, e.g. of failed data matchers 220.

In various embodiments, a notification may be triggered by the mismatch. The notification may include an identification of the affected data matchers 220. This allows a reconfiguration for eliminating the defective data matcher 220.

In various embodiments, the apparatus 200 may be configured for both, diverse and redundant matching of the data frame 110.

The data matchers 220_1, ..., 220_n may in various embodiments be provided with an initial configuration/programming that may be available for a first operation of the apparatus 100. In various embodiments, a user may be required to provide the configuration/programming of the data matchers 220_1, ..., 220_n also for a first operation of the apparatus 200. In various embodiments, the data matchers 220_1, ..., 220_n may be configurable/programmable after a start of operations of the apparatus 200, e.g. during a lifetime of the apparatus.

More generally, in various embodiments, the predetermined selection pattern, the plurality of data patterns, the predetermined selection pattern, the plurality of selection patterns, and/or the predetermined filter pattern may be configurable during an operation of the apparatus 200.

In various embodiments, each of the data matchers 220 may include a matching logic 334, a window selector 330 and a memory 332.

The window selector 330 may be configured to select the subset of the plurality of bits of the data frame 110 to be compared to the predetermined data pattern. As shown in FIG. 4B, the window selector 330 may for example be configured to specify a starting bit and a number of bits of the data frame 110 to be provided to a comparison operator 440, e.g. a hardware tool for performing the comparison/matching operation, e.g. an XOR gate.

The memory 332 may for example be a shift register, and may be configured for temporarily storing the incoming communication data frame 110. The subset of the plurality of bits of the data frame 110 as defined by the window selector 330 may also be provided to the comparison operator 440.

The matching logic 334 may in various embodiments include a filtering mask 444 to allow a bit-by-bit selection/deselection of the bits in the window selected by the window selector 330. The filtering mask 444 may make it possible to detect permutations of bit patterns, in other words, to specify bit patterns to be identified that may be required to have fixed bit values at certain predefined bit positions, and to have a variable (e.g., irrelevant) bit value at certain other predefined bit positions.

This is visualized in FIG. 4B: The predetermined data pattern, which may be stored in a further memory 442 of the data matcher 220 (e.g. of the matching logic 334), may be "100000011". The subset of the plurality of bits of the data frame 110 (as defined by the window selector 330) may be "100000010". As a consequence, the comparison operator 440 may indicate a match for the first eight bits and a mismatch for the last bit of the subset of the plurality of bits. Since an XOR operation is applied by the exemplary comparison operator 440, the result is a bit pattern of eight "1" and one "0".

The filtering mask 444 may be set to ignore a mismatch in the last bit (and in the last bit only), which is indicated by setting the last bit of the filtering mask 444 to "0", and the other bits to "1". In other words, the subset of the plurality of bits will be identified as matching the predetermined data pattern if the first eight bits match, e.g. the subset of the plurality of bits having the values "100000011" and the subset of the plurality of bits having the values "100000010" (which may be considered as permutations of a bit pattern)

will both be considered as matches to the predetermined data pattern "100000011" in consideration of the filtering mask "111111110".

A respective output 220R_0, 220R_1, ..., 220R_n of each of the plurality of data matchers 220_0, 220_1, ..., 220_n may be a sticky matching result that may be latched (e.g. using a latch 448) after the matching window (e.g. TRUE may mean that the predetermined data pattern is found in the incoming communication data frame 110, FALSE may mean that the predetermined data pattern is not found in the incoming communication data frame 110.

In various embodiments, two (or more) of the plurality of data matchers 220_0, 220_1, ..., 220_n may be configured to compare the same subset of the plurality of bits of the data frame 110 to the same predetermined data pattern.

This may be the case for at least some of the plurality of data matchers 220_0, 220_1, ..., 220_n in each of the exemplary embodiments shown in FIG. 6D to FIG. 6F, which will be described below.

In various embodiments, two (or more) of the plurality of data matchers 220_0, 220_1, ..., 220_n, in particular the respective comparison operators 440, may be implemented by including different logic operations/devices for diversity checking purposes. For example, an XOR gate may be used for one or more of the comparison operators 440 (e.g. of the data matchers 220_2 and 220_3 of FIG. 6F), and an XNOR gate may be used for the other one or more of the comparison operators 440 (e.g. of the data matchers 220_6 and 220_7 of FIG. 6F).

Figure 3B:
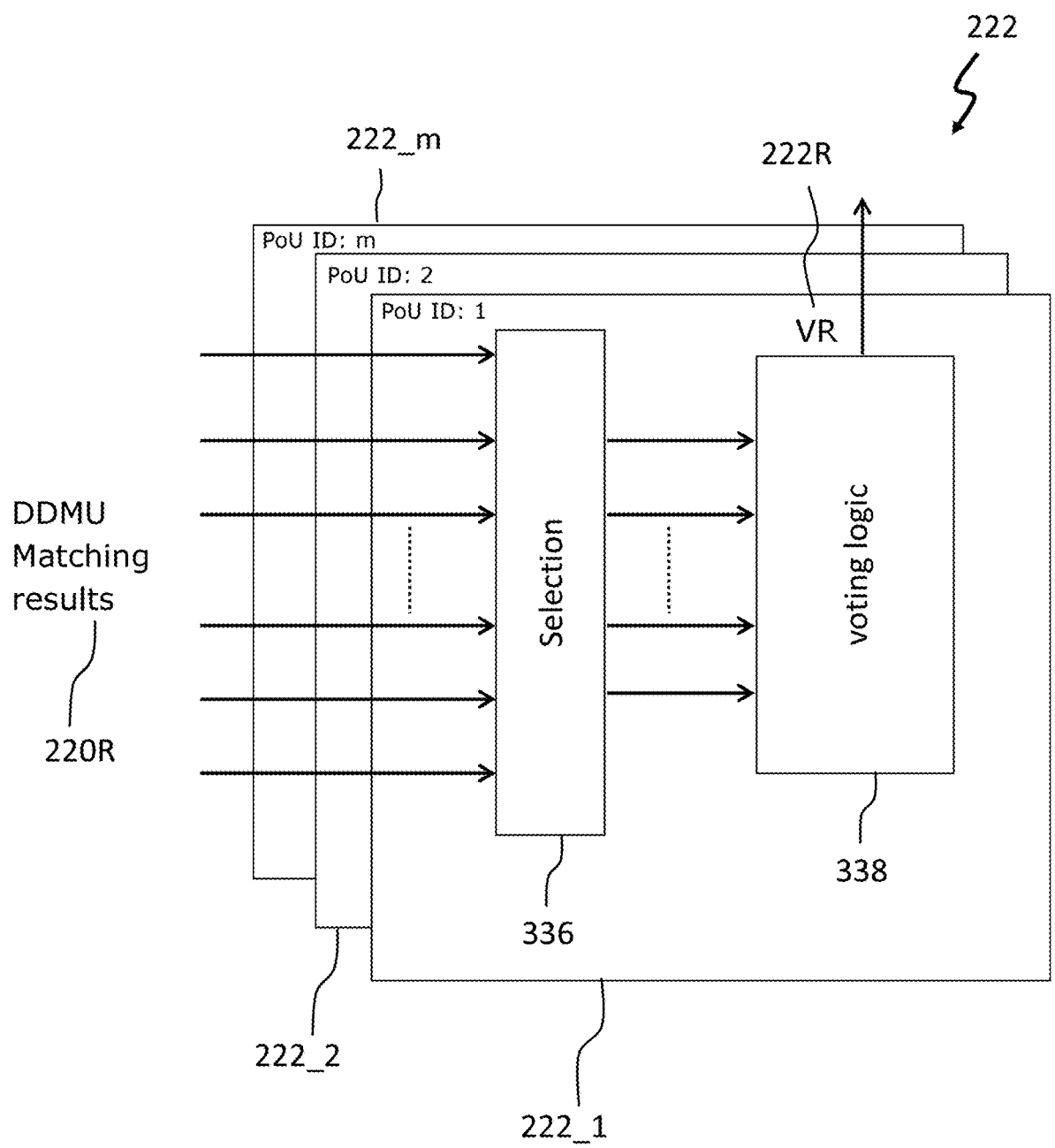
FIG. 3B shows a schematic illustration of a selector of an apparatus for handling an incoming communication data frame in accordance with various embodiments.

FIG. 3B shows a schematic illustration of a selector 222_1 of an apparatus 200 for handling an incoming communication data frame 110 in accordance with various embodiments. Further selectors 222_2, ..., 222_m are indicated as being stacked behind the selector 222_1, and together, they form the plurality of selectors 222.

Each of the selectors 222 may in various embodiments include a selection logic 336 and a voter 338. The voter 338 may include an adder 560, a voting logic 562 and a memory 550 storing a reference value.

Each of the selectors 222 (also referred to as PoU for "pick out unit") may receive as an input the outputs 220R_0, ..., 220R_1, ..., 220R_n indicating the results of the comparison performed by the plurality of data matchers 220. For example, each of the selectors 222_1, ..., 222_m may receive all of the outputs 220R_0, ..., 220R_1, ..., 220R_n.

With all the outputs 220R_0, ..., 220R_1, ..., 220R_n of the flexibly programmable data matchers 220 provided to each of the selectors 222_1, ..., 222_m, the plurality of selectors 222 may be configured to use the selection logic 336 for selecting from the provided outputs 220R_0, ..., 220R_1, ..., 220R_n those that will be used for the voting.

The combined selection and voting process may be used in various embodiments to allow an evaluation not only of a presence or absence of matches between the communication data frame 110 and the predetermined data patterns, but also of the data matchers 220, for example for detecting if one or more of the data matchers 220_0, 220_1, ..., 220_n are defective.

The selection logic 336 may be configured to pass on only selected outputs of the outputs 220R_0, ..., 220R_1, ..., 220R_n on to the voter 338. The adder 560 may be configured to sum up a predefined type of the two types of bit values of only the selected outputs of the outputs 220R_0, 220R_1, ..., 220R_n and to provide the sum to the voting logic 562.

The voting logic 562 may be configured to compare the received sum to a predefined reference value provided by the memory 550.

In other words, each of the selectors 222_1, ..., 222_m may pick up the output 220R_0, ..., 220R_1, ..., 220R_n of the matching result of individual selected data matchers 220, select a subset of the outputs 220R for evaluation, and may compute the voting result 222R (e.g., true or false, keep or drop, 1 or 0) based on the predefined reference count value, which may form a statistic threshold.

Figure 5A:
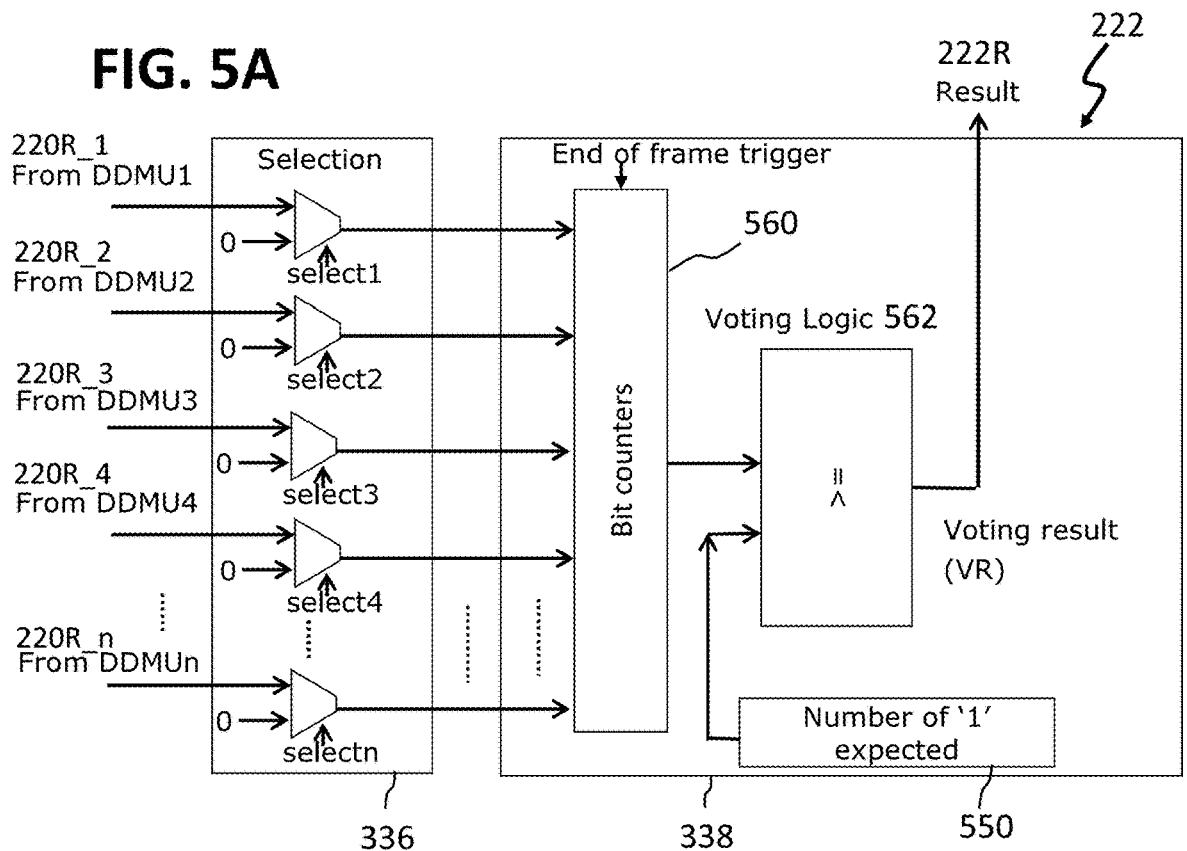
FIG. 5A shows a schematic illustration of a selector of an apparatus for handling an incoming communication data frame in accordance with various embodiments.
Figure 5B:
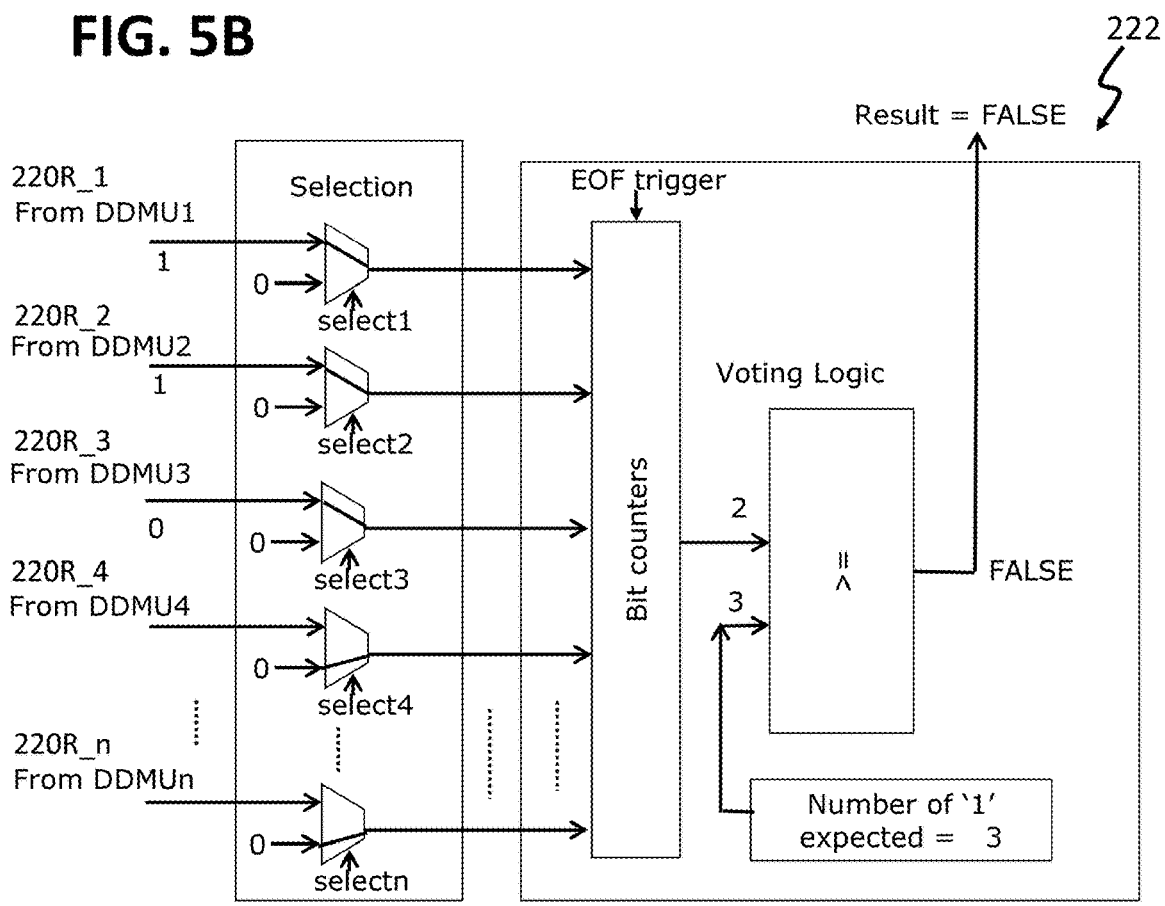
FIG. 5B and FIG. 5C illustrate for exemplary embodiments how the selector of FIG. 5A works.
Figure 5C:
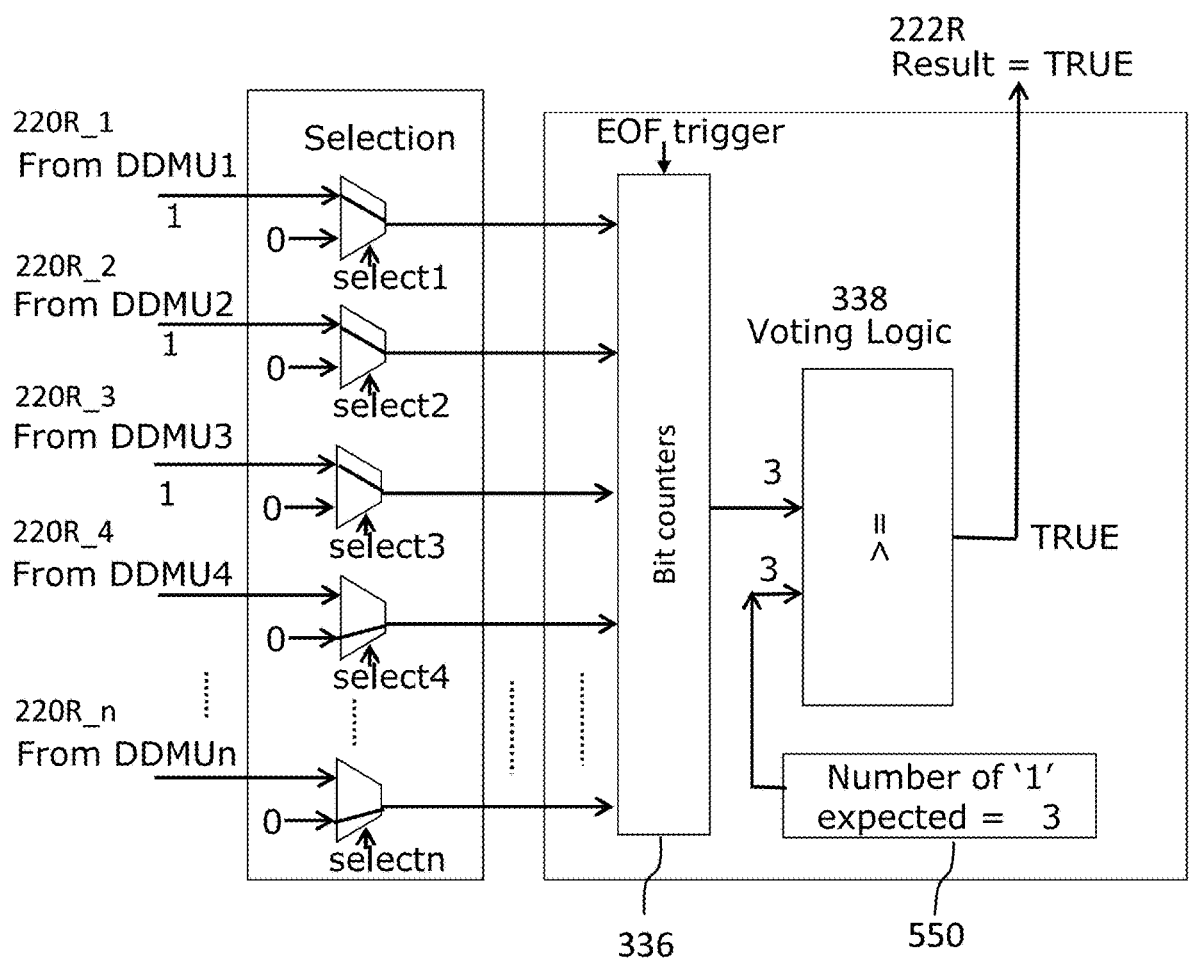

FIG. 5A shows a schematic illustration of a selector 222 of an apparatus 200 for handling an incoming communication data frame 110 in accordance with various embodiments, and FIG. 5B and FIG. 5C illustrate for exemplary embodiments how the selector of FIG. 5A works. To avoid crowding, some of the reference numbers have been omitted in FIG. 5B and FIG. 5C.

As shown in the exemplary embodiment of FIG. 5B, the selection logic 336 may be configured to select only a subset of the outputs 220R_0, ..., 220R_1, ..., 220R_n it receives to the adder 560. In this case, the outputs 220R_1, 220R_2 and 22R_3 (1, 1, and 0, respectively) may be passed on to the adder 560. The selection logic 336 may include a plurality of hardware switches for selecting the outputs 220R_0, ..., 220R_1, ..., 220R_n to be passed on.

The adder 560 (also referred to as bit counter) may be configured to add (count) the "1"s among the bit values of the selected outputs 220R_1, 220R_2 and 22R_3. The sum (in this case 2) may be compared with the predefined reference value (in this case 3). Since the sum is smaller than the predefined reference value, a "fail" indication may be provided as the output 222R_1 of the selector 222_1.

In the exemplary embodiment of FIG. 5C, the outputs 220R_1, 220R_2 and 22R_3 (1, 1, and 1, respectively) may be passed on to the adder 560. The adder 560 may be configured to add (count) the "1"s among the bit values of the selected outputs 220R_1, 220R_2 and 22R_3. The sum (in this case 3) may be compared to the predefined reference value (in this case 3). Since the sum is the same as the predefined reference value, a "true" indication may be provided as the output 222R_1 of the selector 222_1.

FIG. 3C shows a schematic illustration of a frame filter 224 of an apparatus 200 for handling an incoming communication data frame 110 in accordance with various embodiments, and FIG. 3D shows a table illustrating an exemplary frame filter process of the frame filter 224 of FIG. 3C.

The decision to drop or keep the incoming frame 110, in other words, whether to pass it on to the application logic 226 or not, may depend on the frame filtering 224, also referred to as frame filtering logic (FFL).

The frame filter 224 may in various embodiments include a vector generator 354, a decision logic 350, and a switch 352. Additionally, the frame filter 224 may optionally include a timer 342.

The respective outputs 222R_1, ..., 222R_m of the plurality of selectors 222_1, ..., 222_m may be provided to the frame filter 224.

The vector generator 354 of the frame filter 224 may in various embodiments be configured to generate a vector 222R, which may be referred to as voting result vector, from the plurality of selector outputs 222R_1, ..., 222R_m.

The decision logic 350 may be configured to decide, based on the vector 222R and a decision reference, for example a lookup table 370 or a vector table, whether the incoming data frame 110 is kept or dropped. An exemplary lookup table 370 is shown in FIG. 3D.

The decision 350R generated by the decision logic 350 may be provided to the switch 352, which may be configured to pass the data frame 110 to the application logic 226 if the decision 350R is "pass", and to block the data frame 110 from being passed to the application logic 226 if the decision 350R is "drop".

In various embodiments, the timer 342 may be configured to generate a time stamp. The time stamp may represent a certain predefined point in time during the data frame 110 processing, for example the time when the vector 222R is generated, the time when the decision 350R is forwarded to the switch 352, or the like.

The timestamp may be forwarded to the application logic 226 together with the filtered data frame 110. In various embodiments, the vector 222R representing the outputs 222R_1, ..., 222R_m of the selector 222 may additionally be forwarded to the application logic 226 together with the filtered data frame 110. The voting result vector 222R may be used by the application logic 226 to determine a dedicated data frame 110 characteristic.

The vector 222R and/or the time stamp may for example be appended to the data frame 110 or may be provided with an indication of the data frame 110 with which it is associated.

The application logic 226 may include a storing device, e.g. a memory, to store the received filtered original frame 110, and optionally the voting result vector 222R and/or the time stamp.

The apparatus 200 is described above in context with its various functional elements to (e.g. optionally) include memories for the various functional elements, for example a memory for storing the incoming data frame 110, for storing the plurality of data patterns, etc. In various embodiments, the memories may be provided as separate memories, e.g. individual shift registers or the like for each purpose or element.

In various embodiments, the apparatus 200 may include at least one memory configured to store several of the elements to be stored, for example the plurality of selection patterns and the predetermined filter pattern, or the like.

In various embodiments, the apparatus 200 may include a single memory configured to store all the elements to be stored during the filter process, for example to store the plurality of data patterns, the plurality of selection patterns and the predetermined filter pattern.

The exemplary embodiments of the apparatuses 200 shown in FIG. 6A to FIG. 6H will be used to illustrate how a data pattern recognition with redundancy, diversity, flexibility and configurability to detect, recognize and filter data patterns in a deterministic way is provided.

The apparatuses 200 shown in FIG. 6A to FIG. 6H are similar or identical to the apparatus of FIG. 2. A general functionality of the apparatuses 200 of FIG. 6A to FIG. 6H is hence described above in context with FIG. 2, and with FIG. 3A to FIG. 5B, which illustrate details of the apparatus 200. FIG. 6A to FIG. 6H focus on providing examples for certain settings of the data matchers 220.

Figure 6A:
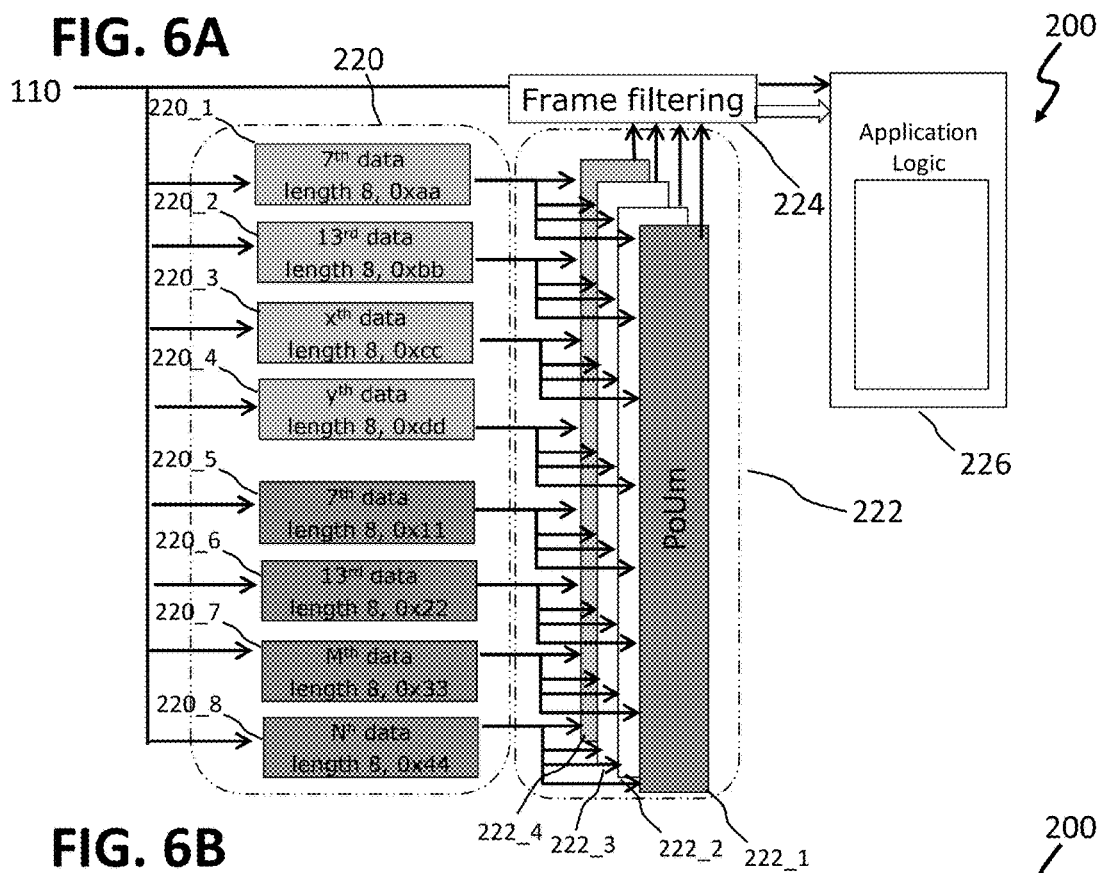
FIG. 6A shows a schematic illustration of a frame filter of an apparatus for handling an incoming communication data frame in accordance with various embodiments.

In FIG. 6A, many of the elements are provided with reference numbers for later reference, in particular when describing the examples of FIG. 6B to FIG. 6H, in which the reference numbers are omitted to avoid crowding.

In each of FIG. 6A to FIG. 6H, the boxes indicating the individual data matchers 220_0, ..., 220_n contain information about the subset of the data frame 110 to be matched (the top line specifies the starting bit of the data frame 110, and the beginning of the second line specifies the length of the subset), and about the predetermined data pattern that is to be matched to the subset (at the end of the second line, in hexadecimal format).

For example, in FIG. 6A, the data matcher 220_1 is configured to match eight bits of the data frame 110 starting at the $7^{th}$ bit to the predetermined data pattern 0xaa, which corresponds to the binary pattern "10101010". Similarly, the data matcher 220_5 is configured to match eight bits of the data frame 110 starting at the yth bit to the predetermined data pattern 0xdd, which corresponds to the binary pattern "11011101".

Each of FIG. 6B to FIG. 6H shows a schematic incoming communication data frame 110 (an Ethernet frame) at the top, with subsets of the plurality of bits that it includes indicated in hexadecimal format. The subsets are indicated at respective predefined positions of the Ethernet frame that correspond to communication protocol layers. In the examples of FIG. 6B to FIG. 6H, counting from the left, the first subset may correspond to a MAC address, the second subset to a VLAN tag, the third subset to an IP Header, e.g. an IP address, and the fourth subset may correspond to TCP/UP, e.g. a port number.

In the exemplars apparatuses 200 of FIG. 6A to FIG. 6H, different groups of data matchers 220 and selectors 222 may be configured to perform redundant and civerse checking.

Figure 6B:
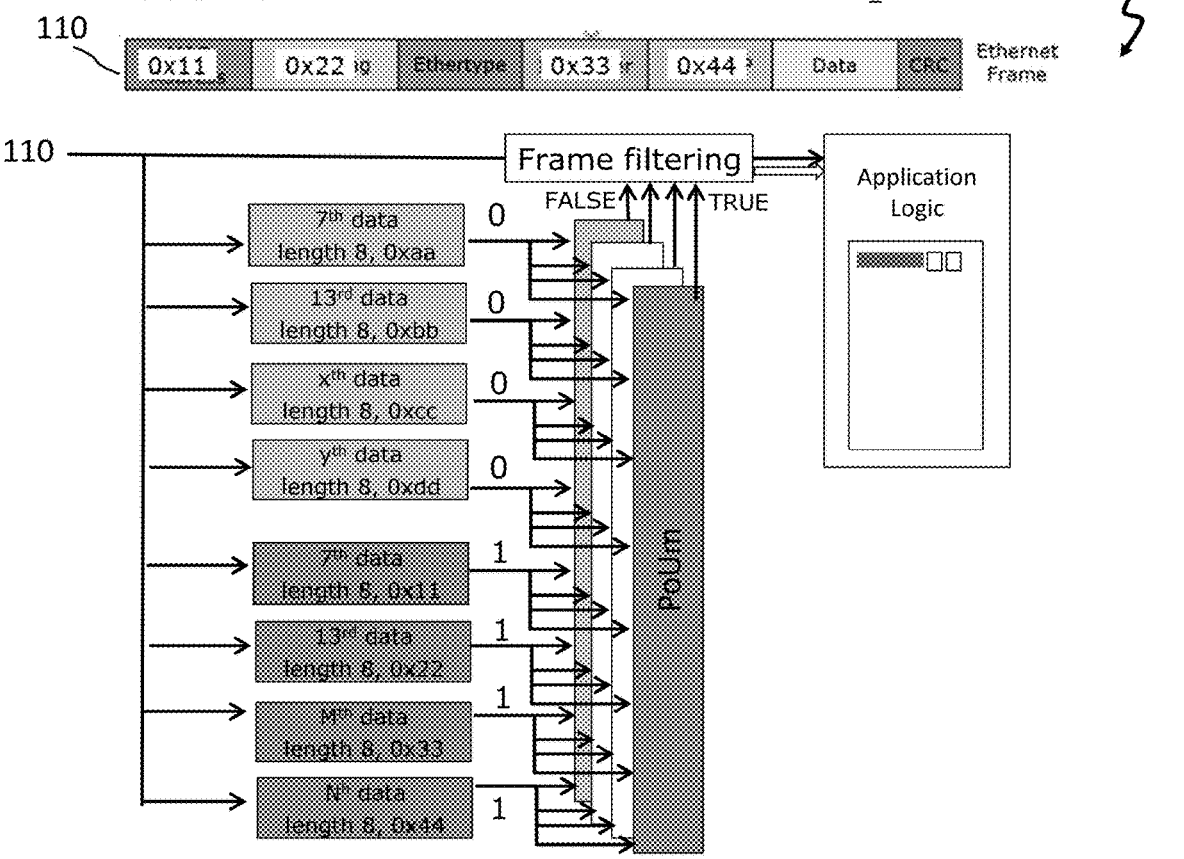
FIG. 6B to FIG. 6H illustrate for exemplary embodiments how the frame filter of FIG. 6A works.

In FIG. 6B, the first to fourth data matcher 220_1, 220_2, 220_3, and 220_4, respectively, are configured to check four different subsets as described above by comparing each of them to a different predetermined data pattern. Furthermore, the seventh and eighth data matchers 220_7 and 220_8, respectively, are configured to check two further different subsets by comparing each of them to a different predetermined data pattern. In other words, the six data matchers 220_1, 220_2, 220_3, 220_4, 220_7 and 220_8 are configured for diverse checking.

The fifth data matcher 220_5 is configured to check the same subset as the first data matcher 220_1, but to compare it to a different predetermined data pattern than the one used for the first data matcher 220_1. Similarly, the sixth data matcher 220_6 is configured to check the same subset as the second data matcher 220_2, but to compare it to a different predetermined data pattern than the one used for the second data matcher 220_2. Thus, also the fifth and the sixth data matcher 220_5 and 220_6, respectively, are configured for diverse checking.

The first to fourth data matchers 220_1, 220_2, 220_3, 220_4 use predetermined data patterns that do not match the respective subsets provided to them (here and in the following always specified in ascending order and as predetermined data pattern vs. subset: 0xaa vs. 0x11, 0xbb vs. 0x22, 0xcc vx. 0x33 and 0xdd vs. 0x44). As a consequence, the output 220R of each of the first to fourth data matchers 220_1, 220_2, 220_3, 220_4 is "0", indicating a mismatch.

The fifth to eighth data matchers 220_5, 220_6, 220_7, 220_8 use predetermined data patterns that match the respective subsets provided to them (0x11 vs. 0x11, 0x22 vs. 0x22, 0x33 vx. 0x33 and 0x44 vs. 0x44). As a consequence, the output 220R of each of the fifth to eighth data matchers 220_5, 220_6, 220_7, 220_8 is "1", indicating a match.

The selectors 222 may be configured in such a way that only the outputs provided by the fifth to eighth data matchers 220_5, 220_6, 220_7, 220_8 are evaluated by the first selector 222_1, and only the first to fourth data matchers 220_1, 220_2, 220_3, 220_4 are evaluated by the fourth selector 222_4. Each of the first selector 222_1 and the fourth selector 222_4 may be configured to expect four "1"s to indicate a "pass". The combination evaluated by the first selector 222_1 and the combination evaluated by the fourth selector 222_4 may for example each be sufficient to determine that the frame having the combined data pattern is to be kept, and that a frame that does not have the combined data pattern is to be rejected.

As a consequence, the frame filter 224 may be configured to determine from the output of the first selector 222_1 that the data frame 110 is to be passed to the application logic 226, and that the generated result vector 222R_4 (1 0 0 0) is also to be transmitted to the application logic 226, optionally together with a generated time stamp.

The frame filter 224 may further be configured to determine from the output of the fourth selector 222_4 that the data frame 110 is to be rejected. This is, however, of little or no consequence for the application 226, since it receives the data frame 110 by permission of the first selector 222_1.

The example of FIG. 6B thus illustrates that the apparatus 200 may be configured to pass a variety of data frames 110 with completely different properties.

Figure 6C:
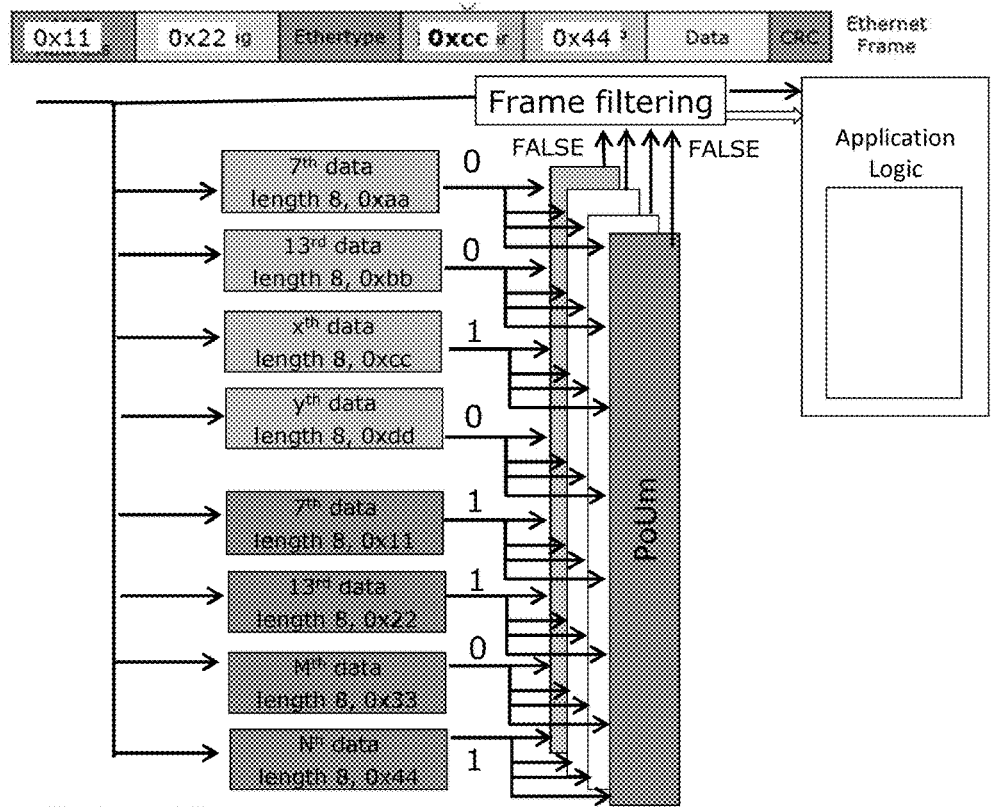

In FIG. 6C, the first to fourth data matcher 220_1, 220_2, 220_3, and 220_4, respectively, are configured to check four different subsets as described above by comparing each of them to a different predetermined data pattern. Furthermore, the seventh and eighth data matchers 220_7 and 220_8, respectively, are configured to check two further different subsets by comparing each of them to a different predetermined data pattern. In other words, the six data matchers 220_1, 220_2, 220_3, 220_4, 220_7 and 220_8 are configured for diverse checking.

The fifth data matcher 220_5 is configured to check the same subset as the first data matcher 220_1, but to compare it to a different predetermined data pattern than the one used for the first data matcher 220_1. Similarly, the sixth data matcher 220_6 is configured to check the same subset as the second data matcher 220_2, but to compare it to a different predetermined data pattern than the one used for the second data matcher 220_2. Thus, also the fifth and the sixth data matcher 220_5 and 220_6, respectively, are configured for diverse checking.

The first, second, fourth, and seventh data matchers 220_1, 220_2, 220_4, 220_7 use predetermined data patterns that do not match the respective subsets provided to them (0xaa vs. 0x11, 0xbb vs. 0x22, 0xdd vs. 0x44, and 0x33 vs. 0xcc). As a consequence, the output 220R of each of the first, second, fourth, and seventh data matchers 220_1, 220_2, 220_4, 220_7 is "0", indicating a mismatch.

The third and fifth, sixth, and eighth data matchers 220_3, 220_5, 220_6, 220_8 use predetermined data patterns that match the respective subsets provided to them (0xcc vs. 0xcc, 0x11 vs. 0x11, 0x22 vs. 0x22, and 0x44 vs. 0x44). As a consequence, the output 220R of each of third and fifth, sixth, and eighth data matchers 220_3, 220_5, 220_6, 220_8 is "1", indicating a match.

The selectors 222 may be configured in such a way that only the outputs provided by the fifth to eighth data matchers 220_5, 220_6, 220_7, 220_8 are evaluated by the first selector 222_1, and only the first to fourth data matchers 220_1, 220_2, 220_3, 220_4 are evaluated by the fourth selector 222_4. Each of the first selector 222_1 and the fourth selector 222_4 may be configured to determine the data frame 110 to be a match only in the case that the outputs 220R of all four data matchers 220 that the respective selector 222_1 or 222_4, respectively, receives are matches. In other words, the number of "1"s expected may be four in each of the first selector 222_1 and the fourth selector 222_4. Hence, the first selector 222_1 may indicate a mismatch, because it receives only three "1"s, and the fourth selector 222_4 may also indicate a mismatch, because it receives only one "1".

The frame filter 224 may be configured to determine from each of the outputs of the first selector 222_1 ("0") and of the fourth selector 222_4 ("0") that the data frame 110 is to be rejected.

The example of FIG. 6C thus illustrates that it may not be sufficient that all of the tested subsets are present somewhere in the predetermined data patterns (first subset in the fifth data matcher 220_1, second subset in the sixth data matcher 220_2, third subset in the third data matcher 220_7, and fourth subset in the eighth data matcher), but that the frame filter 224 may provide a subsequent evaluation grouping the results of the individual data matchers 220R_1, . . . , 220R_8 in such a way that only frames that have a full acceptable combination of subsets are passed on to the application logic 226. In other words, an unambiguous decision is provided by the apparatus 200.

Figure 6D:
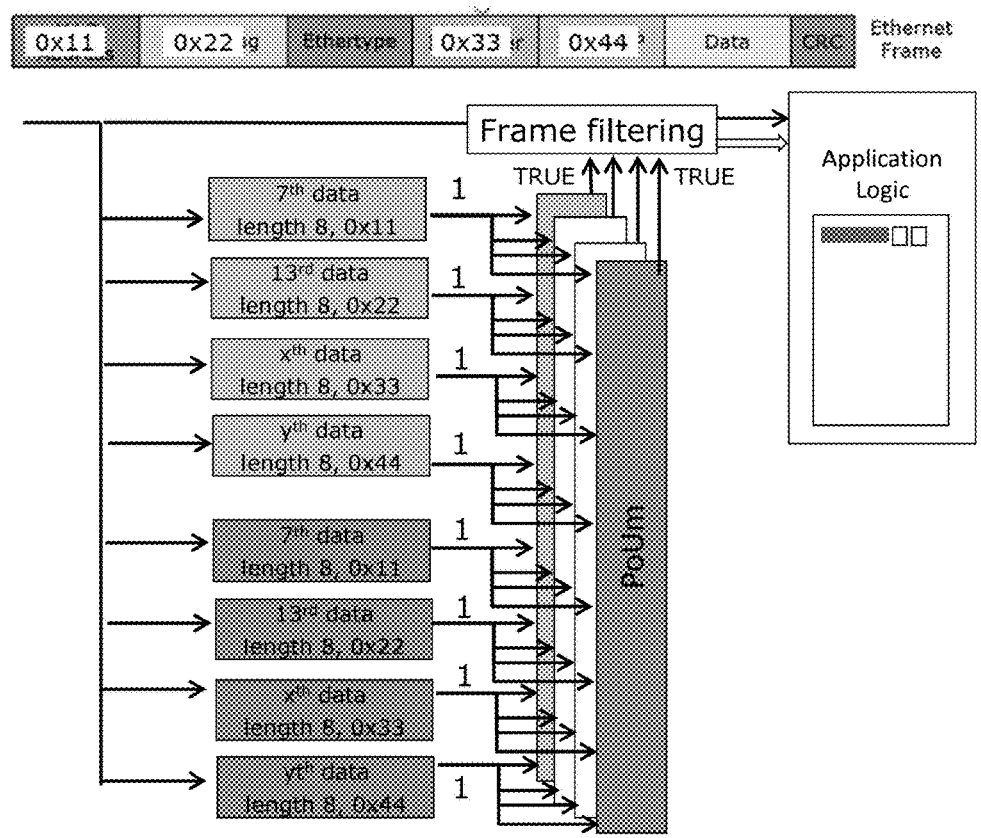

In FIG. 6D, the first to fourth data matcher 220_1, 220_2, 220_3, and 220_4, respectively, are configured to check four different subsets as described above by comparing each of them to a different predetermined data pattern. In other words, the four data matchers 220_1, 220_2, 220_3, 220_4 are configured for diverse checking.

The fifth data matcher 220_5 is configured to check the same subset as the first data matcher 220_1 and to compare it to the same predetermined data pattern as the one used for the first data matcher 220_1. Similarly, the sixth data matcher 220_6 is configured to check the same subset as the second data matcher 220_2 and to compare it to the same predetermined data pattern as the one used for the second data matcher 220_2, the seventh data matcher 220_7 is configured to check the same subset as the third data matcher 220_3 and to compare it to the same predetermined data pattern as the one used for the third data matcher 220_3, and, the eighth data matcher 220_8 is configured to check the same subset as the fourth data matcher 220_4 and to compare it to the same predetermined data pattern as the one used for the fourth data matcher 220_4.

Thus, the fifth to eighth data matchers 220_5 to 220_8, respectively, are configured for redundant checking of the first to fourth data matchers 220_1 to 220_4 (or vice versa).

The fifth to eighth data matchers 220_5, 220_6, 220_7, 220_8 use predetermined data patterns that match the respective subsets provided to them (0x11 vs. 0x11, 0x22 vs. 0x22, 0x33 vx. 0x33 and 0x44 vs. 0x44). As a consequence, the output 220R of each of the fifth to eighth data matchers 220_5, 220_6, 220_7, 220_8 is "1", indicating a match.

Since, as explained above, the fifth to eighth data matchers 220_5, 220_6, 220_7, 220_8 have a redundant setup to the first to fourth data matchers 220_1, 220_2, 220_3, 220_4, also the output 220R of each of the first to fourth data matchers 220_1, 220_2, 220_3, 220_4 is "1", indicating a match.

The selectors 222 may be configured in such a way that only the outputs provided by the fifth to eighth data matchers 220_5, 220_6, 220_7, 220_8 are evaluated by the first selector 222_1, and only the first to fourth data matchers 220_1, 220_2, 220_3, 220_4 are evaluated by the fourth selector 222_4. Each of the first selector 222_1 and the fourth selector 222_4 may be configured to determine the data frame 110 to be a match only in the case that the outputs 220R of all four data matchers 220 that the respective selector 222_1 or 222_4, respectively, receives are matches. In other words, each selector 222 may expect four "1"s. This is the case here, hence each of the first selector 222_1 and the fourth selector 222_4 provides "1" as output. If this had not been a case, a notification may have been issued, as described above.

The frame filter 224 may be configured to apply, as an additional constraint for the redundant checking, that the data frame 110 may be passed on to the application logic 226 only in the case that the first selector 222_1 and the fourth selector 222_4 each indicate a match, which is the case here, such that the data frame 110 is passed to the application logic 226. Furthermore, the result from the selector (1 0 0 1), and optionally the time stamp, may be transmitted to the application logic.

The example of FIG. 6D thus illustrates that it may be possible to detect a failure in the data matchers 220 by applying the redundant checking.

Figure 6E:
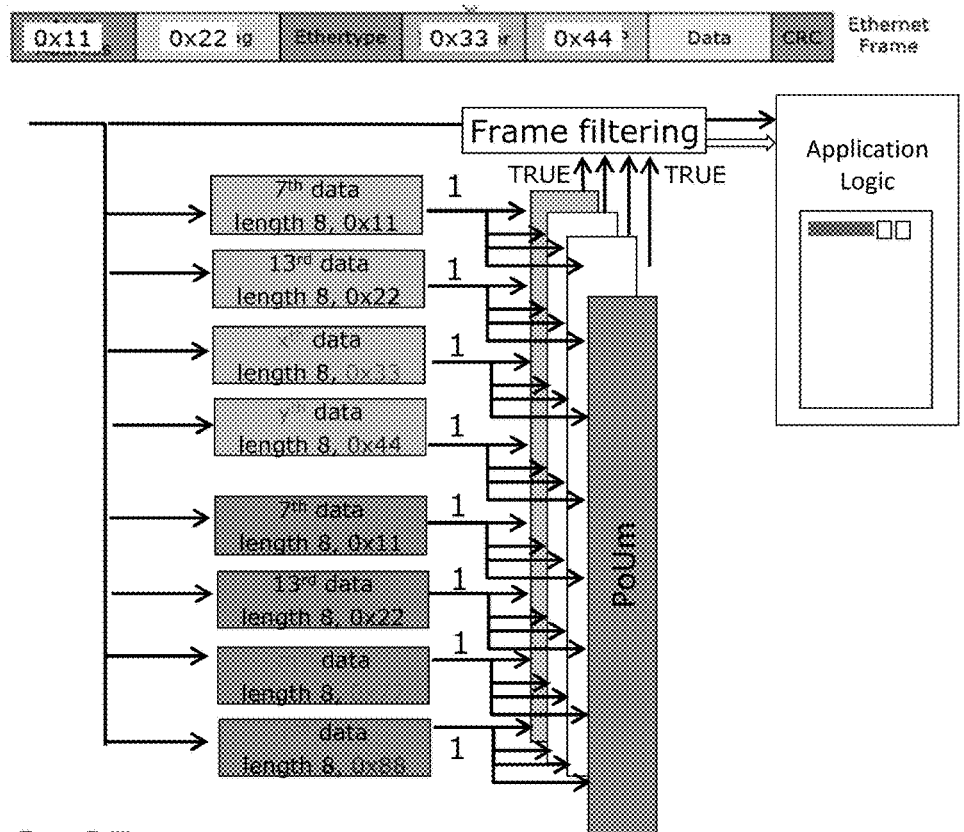

In FIG. 6E, the first to fourth data matcher 220_1, 220_2, 220_3, and 220_4, respectively, are configured to check four different subsets as described above by comparing each of them to a different predetermined data pattern. In other words, the four data matchers 220_1, 220_2, 220_3, 220_4 are configured for diverse checking.

The fifth data matcher 220_5 is configured to check the same subset as the first data matcher 220_1 and to compare it to the same predetermined data pattern as the one used for the first data matcher 220_1. Similarly, the sixth data matcher 220_6 is configured to check the same subset as the second data matcher 220_2 and to compare it to the same predetermined data pattern as the one used for the second data matcher 220_2. The seventh and the eighth data matchers 220_7, 220_8 are configured to check subsets that are different from the predetermined data patterns of the other data matchers 220 and from each other.

Thus, the fifth and sixth data matcher 220_5 and 220_6, respectively, are configured for redundant checking of the first and second data matchers 220_1 and 220_2 (or vice versa).

All eighth data matchers 220_1, . . . , 220_8 use predetermined data patterns that match the respective subsets provided to them. As a consequence, the output 220R of all eight data matchers 220_1, . . . , 220_8 is "1", indicating a match.

The selectors 222 may be configured in such a way that only the outputs provided by the fifth to eighth data matchers 220_5, 220_6, 220_7, 220_8 are evaluated by the first selector 222_1, and only the first to fourth data matchers 220_1, 220_2, 220_3, 220_4 are evaluated by the fourth selector 222_4. Each of the first selector 222_1 and the fourth selector 222_4 may be configured to determine the data frame 110 to be a match only in the case that the outputs 220R of all four data matchers 220 that the respective selector 222_1 or 222_4, respectively, receives are matches. In other words, each of the selectors 222_1 and 222_4 may expect four "1"s. This is the case here, hence each of the first selector 222_1 and the fourth selector 222_4 provides "1" as output. If this had not been a case, a notification may have been issued, as described above.

The frame filter 224 may be configured to apply, as an additional constraint for the redundant checking, that the data frame 110 may be passed on to the application logic 226 only in the case that the first selector 222_1 and the fourth selector 222_4 each indicate a match, which is the case here, such that the data frame 110 is passed to the application logic 226. Furthermore, the result from the selector (1 0 0 1), and optionally the time stamp, may be transmitted to the application logic.

The example of FIG. 6E thus illustrates that it may be possible to combine additional diversity and redundant checking, or to phrase it differently, to provide a safe filtering in terms of filter diversity.

Figure 6F:
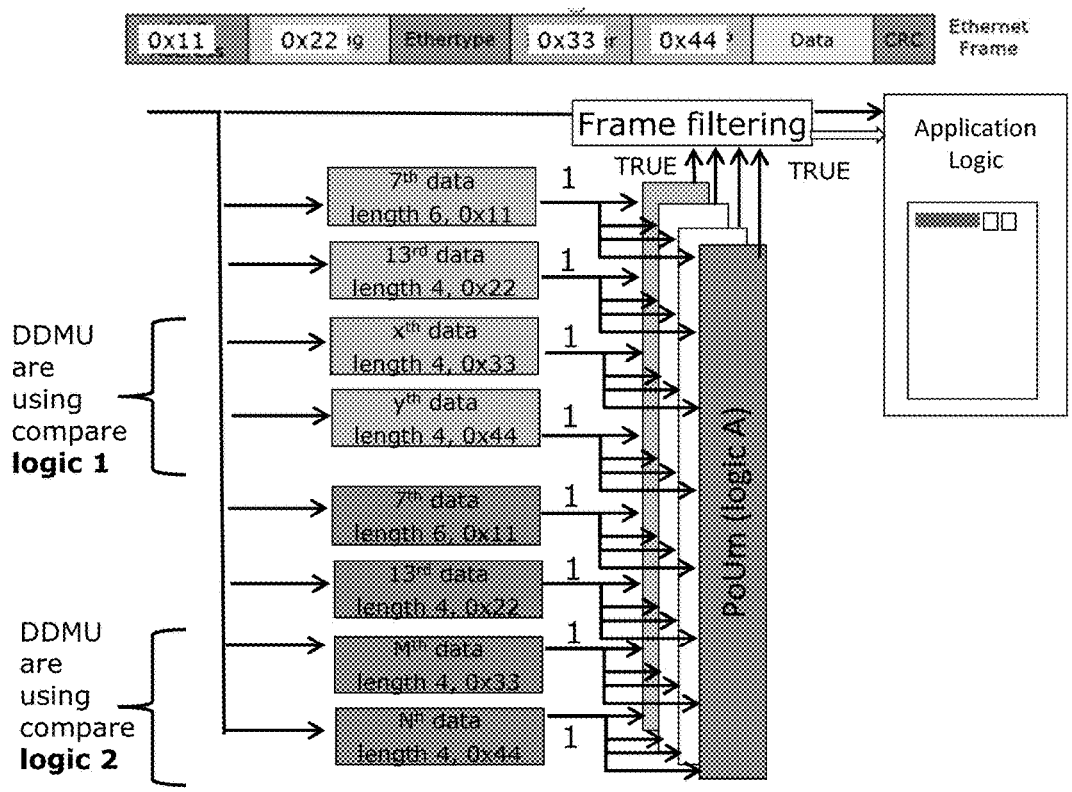

The example illustrated in FIG. 6F may be essentially identical to the example of FIG. 6D described above, in which a redundant check is described.

The exemplary embodiment of FIG. 6F differs from the exemplary embodiment of FIG. 6D in that the third data matcher 220_3 and the fourth data matcher 220_4 are configured to use a first type of logic for the matching (e.g. an XOR logic), whereas the seventh data matcher 220_7 and the eighth data matcher 220_8 may be configured to use a second type of logic for the matching that may be different from the first type of logic. The second type of logic may for example be an XNOR logic. This kind of hardware diversity may provide an additional level of robustness.

Figure 6G:
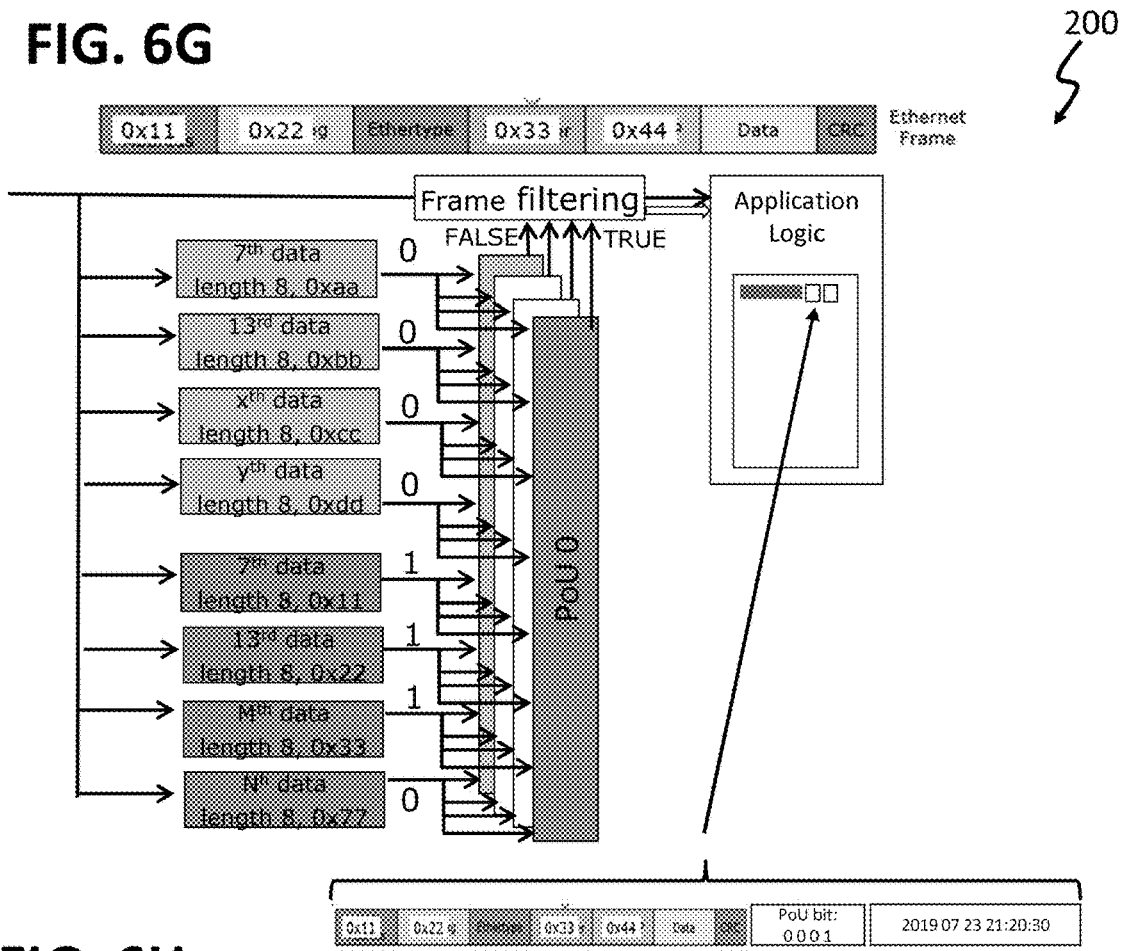

In FIG. 6G, the first to fourth data matcher 220_1, 220_2, 220_3, and 220_4, respectively, are configured to check four different subsets as described above by comparing each of them to a different predetermined data pattern. Furthermore, the seventh and eighth data matchers 220_7 and 220_8, respectively, are configured to check two further different subsets by comparing each of them to a different predetermined data pattern. In other words, the six data matchers 220_1, 220_2, 220_3, 220_4, 220_7 and 220_8 are configured for diverse checking.

The fifth data matcher 220_5 is configured to check the same subset as the first data matcher 220_1, but to compare it to a different predetermined data pattern than the one used for the first data matcher 220_1. Similarly, the sixth data matcher 220_6 is configured to check the same subset as the second data matcher 220_2, but to compare it to a different predetermined data pattern than the one used for the second data matcher 220_2. Thus, also the fifth and the sixth data matcher 220_5 and 220_6, respectively, are configured for diverse checking.

The first to fourth and eighth data matchers 220_1, 220_2, 220_3, 220_4, 220_8 use predetermined data patterns that do not match the respective subsets provided to them (0xaa vs. 0x11, 0xbb vs. 0x22, 0xcc vx. 0x33, 0xdd vs. 0x44, and 0x77 vs. 0x44). As a consequence, the output 220R of each of the first to fourth data matchers 220_1, 220_2, 220_3, 220_4 is "0", indicating a mismatch.

The fifth to seventh data matchers 220_5, 220_6, 220_7 use predetermined data patterns that match the respective subsets provided to them (0x11 vs. 0x11, 0x22 vs. 0x22, and 0x33 vx. 0x33). As a consequence, the output 220R of each of the fifth to seventh data matchers 220_5, 220_6, 220_7 is "1", indicating a match.

The selectors 222 may be configured in such a way that only the outputs provided by the fifth to eighth data matchers 220_5, 220_6, 220_7, 220_8 are evaluated by the first selector 222_1, and only the first to fourth data matchers 220_1, 220_2, 220_3, 220_4 are evaluated by the fourth selector 222_4. Each of the first selector 222_1 and the fourth selector 222_4 may be configured to expect only three or more "1"s to indicate a "pass", in other words, to apply a statistical criterion of considering the frame a match if 75% of the evaluated subsets match. This criterion is fulfilled by the outputs of the fifth to eighth data matchers 220_5, 220_6, 220_7, 220_8 (1 1 1 0, hence three "1"s), but not fulfilled by the outputs of the first to fourth data matchers 220_1, 220_2, 220_3, 220_4 (all zero).

As a consequence, the frame filter 224 may be configured to determine from the output of the first selector 222_1 that the data frame 110 is to be passed to the application logic 226, and that the generated result vector 222R_1 (1 0 0 0)

is also to be transmitted to the application logic 226, optionally together with a generated time stamp.

The result vector 222R_1 may allow for a deeper analysis of frame information, which may be particularly relevant in case like this where a statistical criterion is applied for a pass. Based on the selector result 222R bit pattern, it may be derived which and what setting are in the selector and in the data matcher 220. The provided information may further allow to determine in a case of deviation which part(s) of the data frame 110 is/are different from a 100% match frame The frame filter 224 may further be configured to determine from the output of the fourth selector 222_4 that the data frame 110 is to be rejected. This is, however, of little or no consequence for the application 226, since it receives the data frame 110 by permission of the first selector 222_1.

Figure 6H:
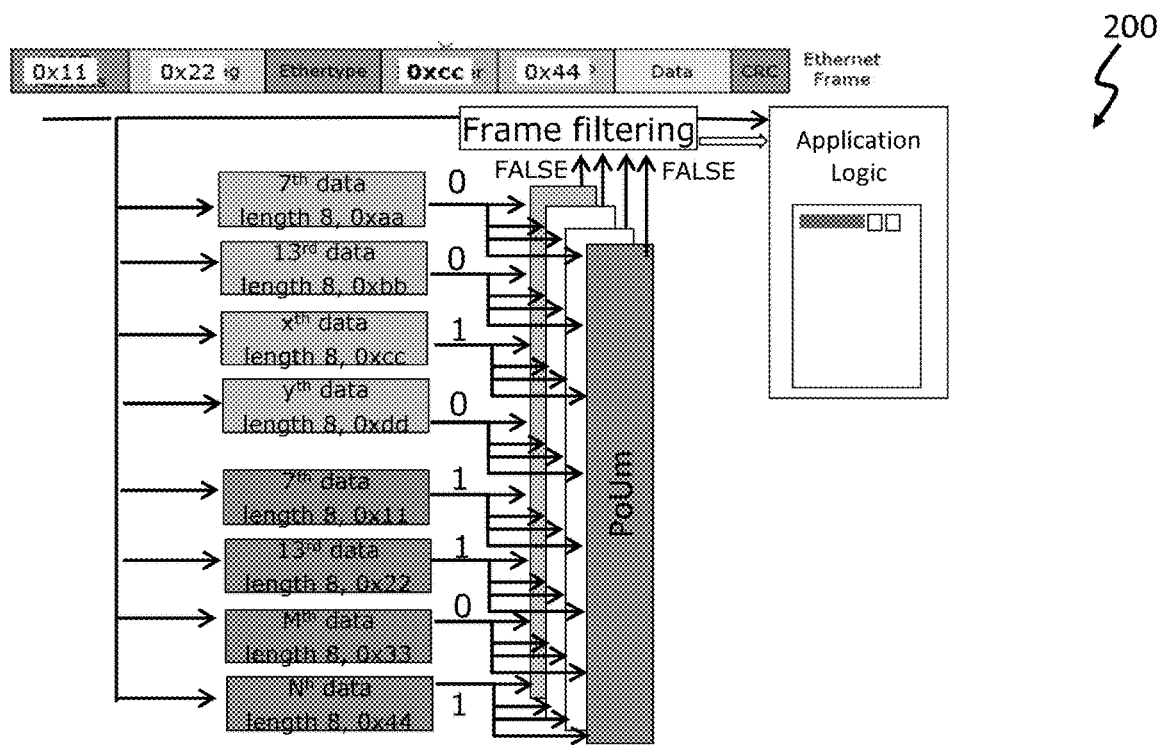

The exemplary embodiment of FIG. 6H may have exactly the same setup as the exemplary embodiment of FIG. 6C regarding the data matchers 220, and also regarding the selectors 222, each of which may again be configured to expect four "1"s to determine a match.

However, unlike the embodiment of FIG. 6C, the frame filter 224 may be configured to pass the data frame 110 (and optionally the output of the selector(s) 222R and/or the time stamp) on to the application logic in the case of two mismatches.

This option may be particularly useful in a case where the application logic 226 is used for analysing failed data frames 110, for example if a data frame provider repeatedly provides corrupt data frames 110 that fail to be passed to an application logic 226 that would be supposed to make use of the data frames 110. In that case the apparatus 200 may be used to identify the corrupt data frames 110 and to divert them to a different application logic 226 for further analysis.

Similarly, harmful files, which may for example have been provided by intruders, may be identified and deliberately passed on to a dedicated application logic 226 for analysis.

In other words, while much of the above description focused on using the apparatus 200 for identifying "good" data frames 110 that match specified criteria for further use, the apparatus 200 may also be used for identifying "bad" data frames 110 that fail to match specified criteria and for passing them on to an application logic 226, predominantly for frame analysis.

Figure 7:
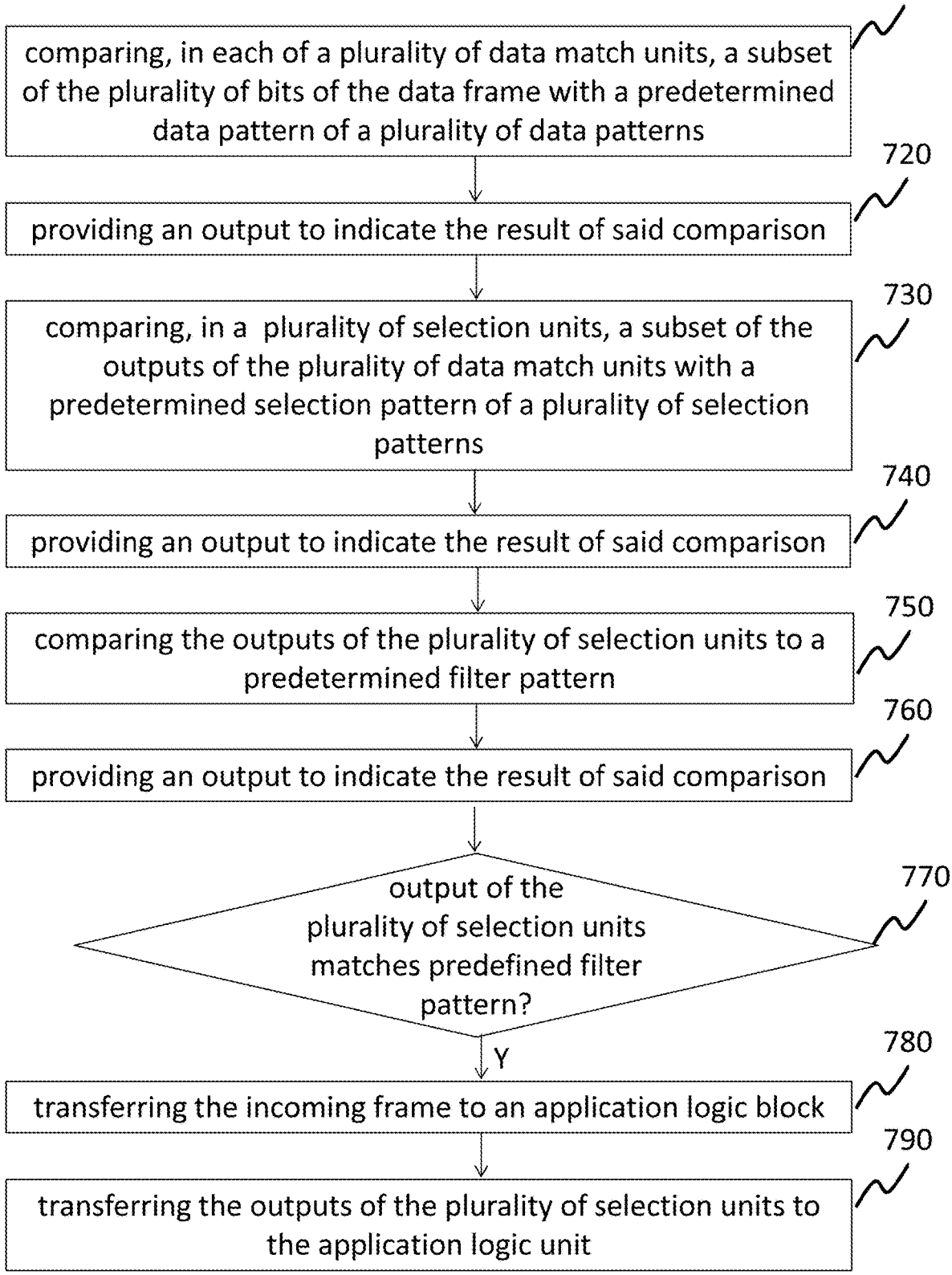
FIG. 7 shows a flow diagram of a method of handling an incoming communication data frame containing a plurality of bits in accordance with various embodiments.

FIG. 7 shows a flow diagram 700 of a method of handling an incoming communication data frame containing a plurality of bits in accordance with various embodiments.

The method may include comparing, in each of a plurality of data matchers, a subset of the plurality of bits of the data frame with a predetermined data pattern of a plurality of data patterns (in 710), providing an output to indicate the result of said comparison (in 720), comparing, in a plurality of selectors, a subset of the outputs of the plurality of data matchers with a predetermined selection pattern of a plurality of selection patterns (in 730), providing an output to indicate the result of said comparison (in 740), comparing the outputs of the plurality of selectors to a predetermined filter pattern (in 750), providing an output to indicate the result of said comparison (in 760), and only if the output indicates that the output of the plurality of selectors matches the predetermined filter pattern (condition 770), transferring the incoming frame to an application logic block (in 780), and transferring the outputs of the plurality of selectors to the application logic (in 790).

Various examples will be illustrated in the following:

Example 1 is an apparatus for handling an incoming communication data frame containing a plurality of bits. The apparatus may include a plurality of data matchers, each data matcher configured to compare a subset of the plurality of bits of the data frame with a predetermined data pattern of a plurality of data patterns and to provide an output to indicate the result of said comparison, a plurality of selectors, each selector configured to compare a subset of the outputs of the plurality of data matchers with a predetermined selection pattern of a plurality of selection patterns and to provide an output to indicate the result of said comparison, and a frame filter configured to transfer the incoming frame to an application logic block only if the outputs of the plurality of selectors match a predetermined filter pattern, and to also transfer the outputs of the plurality of selectors to the application logic.

In Example 2, the subject-matter of Example 1 may optionally include at least one memory configured to store the plurality of data patterns, the plurality of selection patterns and/or the predetermined filter pattern.

In Example 3, the subject-matter of Example 1 or 2 may optionally include that the predetermined selection pattern, the plurality of data patterns, the predetermined selection pattern, the plurality of selection patterns, and/or the predetermined filter pattern are configurable during an operation of the apparatus.

In Example 4, the subject-matter of any of Examples 1 to 3 may optionally include that a first data matcher of the plurality of data matchers is configured to compare a first subset of the plurality of bits of the data frame with a first predetermined data pattern of the plurality of data patterns and to provide a first output to indicate the result of said comparison, that a second data matcher of the plurality of data matchers is configured to compare a second subset of the plurality of bits of the data frame with a second predetermined data pattern of the plurality of data patterns and to provide a second output to indicate the result of said comparison In Example 5, the subject-matter of Example 4 may optionally include that the first subset of the plurality of bits of the data frame originates from a different position in the data frame than the second subset of the plurality of bits of the data frame, and that the first predetermined data pattern is different from the second predetermined data pattern.

In Example 6, the subject-matter of Example 4 or 5 may optionally include that a hardware configuration, e.g. an operation logic, of the first data matcher is different from a hardware configuration, e.g. an operation logic, of the second data matcher.

In Example 7, the subject-matter of Example 4 or 5 may optionally include that a hardware configuration, e.g. an operation logic, of the first data matcher is the same as a hardware configuration, e.g. an operation logic, of the second data matcher.

In Example 8, the subject-matter of any of Examples 4 to 7 may optionally include that each data frame includes payload data of a plurality of communication protocol layers, that the first subset of the plurality of bits originates from a first layer of the plurality of communication protocol layers, and that the second subset of the plurality of bits originates from a second layer of the plurality of communication protocol layers.

In Example 9, the subject-matter of any of Examples 1 to 8 may optionally include that a third data matcher of the plurality of data matchers is configured to compare a third subset of the plurality of bits of the data frame with a third predetermined data pattern of the plurality of data patterns and to provide a third output to indicate the result of said comparison, and that a fourth data matcher of the plurality of data matchers is configured to compare the third subset of the plurality of bits of the data frame with the third predetermined data pattern of the plurality of data patterns and to provide a fourth output to indicate the result of said comparison.

In Example 10, the subject-matter of Example 9 may optionally include that each of the predetermined selection patterns and the predetermined filter pattern are set to lead to a match if the third output matches the fourth output.

In Example 11, the subject-matter of Example 9 or 10 may optionally include that a hardware configuration, e.g. an operation logic, of the third data matcher is different from a hardware configuration, e.g. an operation logic, of the fourth data matcher.

In Example 12, the subject-matter of Example 9 or 10 may optionally include that a hardware configuration, e.g. an operation logic, of the third data matcher is the same as a hardware configuration, e.g. an operation logic, of the fourth data matcher.

In Example 13, the subject-matter of any of Examples 1 to 12 may optionally include that in each selector, the predetermined selection pattern is configured to select or deselect the bits of the output of the result of the comparison between the plurality of bits of the data frame and the predetermined data pattern.

In Example 14, the subject-matter of any of Examples 1 to 13 may optionally include a timer circuit configured to create a time stamp for each handled data frame, wherein the frame filter is further configured, in the case of transferring the data frame to the application logic, to also transfer the corresponding time stamp to the application logic.

In Example 15, the subject-matter of any of Examples 1 to 14 may optionally further include a frame counter circuit configured to create a frame identifier for each handled data frame, wherein the frame filter is further configured, in the case of transferring the data frame to the application logic, to also transfer the corresponding frame identifier to the application logic.

Example 16 is a method of handling an incoming communication data frame containing a plurality of bits. The method may include comparing, in each of a plurality of data matchers, a subset of the plurality of bits of the data frame with a predetermined data pattern of a plurality of data patterns, providing an output to indicate the result of said comparison, comparing, in a plurality of selectors, a subset of the outputs of the plurality of data matchers with a predetermined selection pattern of a plurality of selection patterns, providing an output to indicate the result of said comparison, comparing the outputs of the plurality of selectors to a predetermined filter pattern, providing an output to indicate the result of said comparison, and only if the output indicates that the output of the plurality of selectors matches the predetermined filter pattern, transferring the incoming frame to an application logic block, and transferring the outputs of the plurality of selectors to the application logic.

In Example 17, the subject-matter of Example 16 may optionally further include storing the plurality of data patterns, the plurality of selection patterns and/or the predetermined filter pattern.

In Example 18, the subject-matter of Example 16 or 17 may optionally further include configuring, during an operation of the apparatus, the predetermined selection pattern, the plurality of data patterns, the predetermined selection pattern, the plurality of selection patterns, and/or the predetermined filter pattern.

In Example 19, the subject-matter of any of Examples 16 to 18 may optionally further include comparing a first subset of the plurality of bits of the data frame with a first predetermined data pattern of the plurality of data patterns, providing a first output to indicate the result of said comparison, comparing a second subset of the plurality of bits of the data frame with a second predetermined data pattern of the plurality of data patterns, and providing a second output to indicate the result of said comparison.

In Example 20, the subject matter of Example 19 may optionally further include that the first subset of the plurality of bits of the data frame originates from a different position in the data frame than the second subset of the plurality of bits of the data frame, and that the first predetermined data pattern is different from the second predetermined data pattern.

In Example 21, the subject-matter of Example 19 or 20 may optionally further include that each data frame includes payload data of a plurality of communication protocol layers, that the first subset of the plurality of bits originates from a first layer of the plurality of communication protocol layers, and that the second subset of the plurality of bits originates from a second layer of the plurality of communication protocol layers.

In Example 22, the subject-matter of any of Examples 16 to 21 may optionally further include that a third data matcher of the plurality of data matchers is configured to compare a third subset of the plurality of bits of the data frame with a third predetermined data pattern of the plurality of data patterns and to provide a third output to indicate the result of said comparison, and that a fourth data matcher of the plurality of data matchers is configured to compare the third subset of the plurality of bits of the data frame with the third predetermined data pattern of the plurality of data patterns and to provide a fourth output to indicate the result of said comparison.

In Example 23, the subject-matter of Example 22 may optionally further include that each of the predetermined selection patterns and the predetermined filter pattern are set to lead to a match if the third output matches the fourth output.

In Example 24, the subject-matter of any of Examples 16 to 23 may optionally further include that, in each selector, the predetermined selection pattern is configured to select or deselect the bits of the output of the result of the comparison between the plurality of bits of the data frame and the predetermined data pattern.

In Example 25, the subject-matter of any of Examples 16 to 24 may optionally further include creating a time stamp for each handled data frame, and, when transferring the data frame to the application logic, transferring the corresponding time stamp to the application logic.

In Example 26, the subject-matter of any of Examples 16 to 25 may optionally further include creating a frame identifier for each handled data frame, and, when transferring the data frame to the application logic, transferring the corresponding frame identifier to the application logic.

In Example 27, the subject-matter of any of Examples 16 to 26 may optionally further include that the comparing in each of the plurality of data matchers is performed in parallel.

In Example 28, the subject-matter of any of Examples 16 to 27 may optionally further include that the comparing in each of the plurality of selectors is performed in parallel.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An apparatus for handling an incoming communication data frame having a plurality of bits, the apparatus comprising:
   a plurality of data matchers, each data matcher configured to compare a subset of the plurality of bits of the communication data frame with a predetermined data pattern of a plurality of data patterns and to provide a data matcher output to indicate the result of the data matcher comparison;
   a plurality of selectors, each selector configured to compare a subset of the data matcher outputs of the plurality of data matchers with a predetermined selection pattern of a plurality of selection patterns and to provide a selector output to indicate the result of the selector comparison; and
   a frame filter configured to transfer the incoming communication data frame to application logic only if the selector outputs of the plurality of selectors match a predetermined filter pattern, and to also transfer the selector outputs of the plurality of selectors to the application logic.

2. The apparatus of claim 1, further comprising:
   at least one memory configured to store the plurality of data patterns, the plurality of selection patterns and/or the predetermined filter pattern.

3. The apparatus of claim 1, wherein the plurality of data patterns, the predetermined selection pattern, the plurality of selection patterns, and/or the predetermined filter pattern are configurable during an operation of the apparatus.

4. The apparatus of claim 1,
   wherein a first data matcher of the plurality of data matchers is configured to compare a first subset of the plurality of bits of the communication data frame with a first predetermined data pattern of the plurality of data patterns and to provide a first data matcher output to indicate the result of the first data matcher comparison, and
   wherein a second data matcher of the plurality of data matchers is configured to compare a second subset of the plurality of bits of the communication data frame with a second predetermined data pattern of the plurality of data patterns and to provide a second data matcher output to indicate the result of the second data matcher comparison.

5. The apparatus of claim 4,
   wherein the first subset of the plurality of bits of the communication data frame originates from a different position in the communication data frame than the second subset of the plurality of bits of the communication data frame, and
   wherein the first predetermined data pattern is different from the second predetermined data pattern.

6. The apparatus of claim 4, wherein a hardware configuration of the first data matcher is different from a hardware configuration of the second data matcher.

7. The apparatus of claim 4,
   wherein a third data matcher of the plurality of data matchers is configured to compare a third subset of the plurality of bits of the communication data frame with a third predetermined data pattern of the plurality of data patterns and to provide a third data matcher output to indicate the result of the third data matcher comparison, and
   wherein a fourth data matcher of the plurality of data matchers is configured to compare the third subset of the plurality of bits of the communication data frame with the third predetermined data pattern of the plurality of data patterns and to provide a fourth data matcher output to indicate the result of the fourth data matcher comparison.

8. The apparatus of claim 7, wherein each of the predetermined selection patterns and the predetermined filter pattern are set to lead to a match if the third data matcher output matches the fourth data matcher output.

9. The apparatus of claim 7, wherein a hardware configuration of the third data matcher is different from a hardware configuration of the fourth data matcher.

10. The apparatus of claim 1, wherein each selector is configured to select or deselect, based on the predetermined selection pattern, the bits of the data matcher output of the result of the data matcher comparison between the plurality of bits of the communication data frame and the predetermined data pattern.

11. The apparatus of claim 1, further comprising:
    a timer circuit configured to create a time stamp for each handled communication data frame,
    wherein the frame filter is further configured, in the case of transferring the communication data frame to the application logic, to also transfer the corresponding time stamp to the application logic.

12. The apparatus of claim 1, further comprising:
    a frame counter circuit configured to create a frame identifier for each handled communication data frame,
    wherein the frame filter is further configured, in the case of transferring the communication data frame to the application logic, to also transfer the corresponding frame identifier to the application logic.

13. A method of handling an incoming communication data frame containing a plurality of bits, the method comprising:
    comparing, in each of a plurality of data matchers, a subset of the plurality of bits of the communication data frame with a predetermined data pattern of a plurality of data patterns;
    providing, from each of the plurality of data matchers, a data matcher output to indicate the result of the comparison;
    comparing, in a plurality of selectors, a subset of the data matcher outputs of the plurality of data matchers with a predetermined selection pattern of a plurality of selection patterns;
    providing, from each of the plurality of selectors, a selector output to indicate the result of the selector comparison;
    comparing, in a frame filter, the selector outputs of the plurality of selectors to a predetermined filter pattern;
    providing, from the frame filter, a frame filter output to indicate the result of the frame filter comparison; and
    only if the frame filter output indicates that the selector outputs of the plurality of selectors matches the predetermined filter pattern:
      transferring the incoming communication data frame to application logic; and
      transferring the selector outputs of the plurality of selectors to the application logic.

14. The method of claim 13, further comprising:
storing the plurality of data patterns, the plurality of selection patterns and/or the predetermined filter pattern.

15. The method of claim 13, further comprising:
configuring, during an operation of the method, the plurality of data patterns, the predetermined selection pattern, the plurality of selection patterns, and/or the predetermined filter pattern.

16. The method of claim 13, further comprising:
comparing, in a first data matcher, a first subset of the plurality of bits of the communication data frame with a first predetermined data pattern of the plurality of data patterns;
providing a first data matcher output to indicate the result of the first data matcher comparison;
comparing, in a second data matcher, a second subset of the plurality of bits of the communication data frame with a second predetermined data pattern of the plurality of data patterns; and
providing a second data matcher output to indicate the result of the second data matcher comparison.

17. The method of claim 16,
wherein the first subset of the plurality of bits of the communication data frame originates from a different position in the communication data frame than the second subset of the plurality of bits of the communication data frame, and
wherein the first predetermined data pattern is different from the second predetermined data pattern.

18. The method of claim 16, further comprising:
comparing, in a third data matcher of the plurality of data matchers, a third subset of the plurality of bits of the communication data frame with a third predetermined data pattern of the plurality of data patterns;
providing a third data matcher output to indicate the result of the third data matcher comparison
comparing, in a fourth data matcher of the plurality of data matchers, the third subset of the plurality of bits of the communication data frame with the third predetermined data pattern of the plurality of data patterns; and
providing a fourth data matcher output to indicate the result of the fourth data matcher comparison.

19. The method of claim 18, wherein each of the predetermined selection patterns and the predetermined filter pattern are set to lead to a match if the third data matcher output matches the fourth data matcher output.

20. The method of claim 13, further comprising:
selecting or deselecting, in each selector based on the predetermined selection pattern, the bits of the output of the result of the comparison between the plurality of bits of the communication data frame and the predetermined data pattern.

21. The method of claim 13, further comprising:
creating a time stamp for each handled communication data frame; and
when transferring the communication data frame to the application logic, transferring the corresponding time stamp to the application logic.

22. The method of claim 13, further comprising:
creating a frame identifier for each handled communication data frame; and
when transferring the communication data frame to the application logic, transferring the corresponding frame identifier to the application logic.

23. The method of claim 13,
wherein the comparing in each of the plurality of data matchers is performed in parallel.

24. The method of claim 13,
wherein the comparing in each of the plurality of selectors is performed in parallel.

* * * * *